United States Patent [19]
Hargreaves et al.

[11] Patent Number: 6,005,496
[45] Date of Patent: Dec. 21, 1999

[54] ERGONOMIC KEYBOARD APPARATUS

[75] Inventors: William R. Hargreaves, Bellevue; Shirley A. Lunde, Seattle, both of Wash.

[73] Assignee: Kinesis Corporation, Bothell, Wash.

[21] Appl. No.: 08/854,566

[22] Filed: May 12, 1997

Related U.S. Application Data

[63] Continuation of application No. 08/046,584, Apr. 9, 1993, Pat. No. 5,661,475, which is a continuation-in-part of application No. 07/683,980, Apr. 10, 1991, abandoned.

[30] Foreign Application Priority Data

Apr. 10, 1992 [WO] WIPO ...................... PCT/US92/02957

[51] Int. Cl.⁶ ................................................... B41J 5/10
[52] U.S. Cl. ..................... 341/22; 400/475; 345/168
[58] Field of Search ...................... 400/475; 341/22; 345/156, 163, 157, 167; 84/653

[56] References Cited

U.S. PATENT DOCUMENTS

| | | | |
|---|---|---|---|
| 1,202,213 | 10/1916 | Patten | 400/475 |
| 1,336,151 | 4/1920 | O'Connor | 400/475 |
| 1,589,193 | 6/1926 | Mathews | 400/475 |
| 4,244,659 | 1/1981 | Malt | 400/486 |
| 4,783,645 | 11/1988 | Goldwasser | 400/482 |
| 5,067,834 | 11/1991 | Szmanda | 341/22 |
| 5,115,705 | 5/1992 | Monte | 84/617 |
| 5,148,152 | 9/1992 | Steuckle | 345/145 |
| 5,322,967 | 6/1994 | Matsuda | 84/653 |
| 5,334,997 | 8/1994 | Scallon | 345/167 |
| 5,351,066 | 9/1994 | Rucker | 341/22 |

FOREIGN PATENT DOCUMENTS

| | | |
|---|---|---|
| 1016993 | 1/1966 | United Kingdom . |
| 2181096 | 8/1985 | United Kingdom . |

*Primary Examiner*—Michael Horabik
*Assistant Examiner*—Albert K. Wong
*Attorney, Agent, or Firm*—Sheridan Ross P.C.

[57] ABSTRACT

A keyboard for use with a standard personal computer includes an alphanumeric key array having a plurality of alphanumeric keys arranged in a generally orthogonal, concave array. A home row of keys defines a reference position for the fingers of the operator. A liner array of function keys is provided and positioned above the reference position and tilted toward the operator. A generally orthogonal array of auxiliary keys is also positioned above the reference position. The array of auxiliary keys is rotated with respect to the reference position to accommodate the natural angle of the thumb of the operator to the index finger. A palm rest is provided for receiving the palm of the operator while the operator is manipulating the plurality of alphanumeric keys. The palm rest is positioned above the reference position defined by the home row so that during operation of the alphanumeric keys, the fingers of the operator extend downward from the palm rest in a natural curved manner.

18 Claims, 16 Drawing Sheets

ERGONOMIC KEYBOARD APPARATUS

This is a continuation of application Ser. No. 08/046,584, filed Apr. 9, 1993 now U.S. Pat. No. 5,661,475 which is a continuation-in-part of Ser. No. 07/683,980 now abandoned, filed Apr. 10, 1991, both of which are incorporated herein by reference. Reference is made to commonly-assigned Patent Cooperation Treaty application No. PCT/US92/02957, filed Apr. 10, 1992 and to commonly-assigned U.S. patent application Ser. No. 07/931,736 filed Aug. 18, 1992 now abandoned for KEYBOARD AND METHOD FOR PRODUCING, and to U.S. Design Patent Application Ser. No. 29/006,481 for KEYBOARD, filed Mar. 29, 1993, U.S. Pat. No. D370,669 all of which are incorporated herein by reference.

The present invention relates generally to keyboards used for data input in conjunction with typewriters, computers and other like devices and, more particularly, an ergonomic keyboard for use with modern computers.

BACKGROUND OF THE INVENTION

The conventional typewriter and computer keyboard, hereinafter called the conventional QWERTY keyboard, consists in diagrammatic representation of four horizontal rows of alphanumeric keys. The keys on one row are offset with respect to the keys on adjacent rows so that diagonal columns are formed. The name "QWERTY" comes from the letter layout of the left side second row. While certain differences exist for non-English language keyboards, these differences are essentially standardized and will be considered "QWERTY" for this application.

The QWERTY keyboard has long been recognized to have many disadvantages, including the following: the most commonly used letters are on the top row rather than on the home (middle) row, where the fingers normally rest; many of the most frequent stroking actions must be done by the weakest fingers (the little fingers); the left hand executes more strokes, both in terms of number and complexity, than the right hand, even though the majority of users are right-handed; the little finger of the right hand must select from at least 15 keys on the modern computer keyboard (IBM-AT compatible enhanced 101 keyboard), some of which are infrequently used and thus require visual selection even by most touch typists; more complex stroking movements are required by the staggered key arrangement than would be required were the keys arranged in orthogonal rows and columns. Furthermore, large numbers of specialized "function", "control", and editing keys have evolved for use with modern computer software. Such function and control keys are often used in combination with other keys, further increasing the difficulty in comfortably and accurately typing all the keys on a modern computer keyboard.

A major problem with the extensive and combined use of specialized computer keys is the awkward postures required for the arms, wrists, hands, and fingers. In recent years these awkward postures, combined with both static and dynamic exertion required to press and hold down keys, have been implicated as causative factors in an epidemic of painful and sometimes disabling occupational injuries. Thus, in addition to the disadvantages of traditional keyboards related to operator performance (speed, accuracy, endurance), these keyboards have also been shown to cause serious health problems. The health problems caused by excessive keyboard use are collectively called repetitive strain injuries. In combination with simple repetition of forceful motion, major factors which are believed to lead to health problems include pronation of the wrist, extension of the wrist, and ulnar deviation, among others. These injurious factors are caused or exaggerated by the use of traditional QWERTY keyboards.

Many prior art keyboard arrangements have been proposed to eliminate the inadequacies of the QWERTY keyboard. These prior art keyboard arrangements generally fall into three groups, referred to herein as the "letter layout alternatives" group, the "geometric alternatives" group and the "chordic alternatives" group. However, as discussed in more detail below, these prior art keyboard arrangements have suffered from incomplete solutions and/or excessive training requirements, and have failed to combine relief from physically stressful postures and motions with productivity equal or exceeding the traditional keyboard and minimal training/retraining requirements. As a result, none of the prior art keyboard arrangements have gained widespread acceptance.

The letter layout alternatives group consists of keyboards in which the standard alphanumeric key set is employed, but the order of the keys has been varied while retaining the standard keyboard geometry. An example of a keyboard that falls into this group is provided in U.S. Pat. No. 2,040,248, issued to Dvorak on May 12, 1936. The Dvorak patent describes a keyboard in which the layout of the alphanumeric keys is based on incidence of usage. Dvorak attempted to position the most heavily used keys (e.g.,"E") in the home row, and to minimize awkward letter combinations and long reaches. However, the keyboard of the Dvorak patent, as well as other keyboards falling into the letter layout alternatives group, suffers from the disadvantage that significant relearning is required before it can be used by a skilled touch typist accustomed to a QWERTY keyboard. Furthermore, this layout does nothing to address the awkward postures and excessive force used by operators of keyboards with traditional key positioning and geometry.

The geometric alternatives group consists of keyboards in which both the standard alphanumeric key set and key layout are typically employed, but the geometry of the keyboard has been varied. As an example, U.S. Pat. No. 1,652,464, issued Dec. 13, 1927 to Tyberg, describes a planar QWERTY keyboard which is split into right and left hand segments. The right and left hand segments are separated from one another and linked in a fixed position to a central segment containing keys such as "release", "shift", "paper", "feed", "return" and "space". As another example, U.S. Pat. No. 4,244,659, issued Jan. 13, 1981, to Malt describes a keyboard employing concave wells for right and left hand segments. The right and left hand segments of the keyboard described by Tyberg and Malt maintain the layout of the QWERTY keyboard so that significant relearning of the keyboard is not required.

However, the keyboards described by Tyberg and Malt, as well as others falling into the geometric alternatives group, do not address the problems of extensive work and excessive key selection that is required by modern keyboards having function and auxiliary keys. Therefore, although providing a keyboard that reduces pronation of the wrist and ulnar deviation, prior art keyboards falling into the geometric alternatives group are not acceptable for use with modern keyboards having multiple function and auxiliary keys.

The chordic alternatives group consists of keyboards in which the alphanumeric key set and the key layout, as well as the keyboard geometry have been varied. Key combinations or "chords" are used to enter letters or numbers which are not represented by single keys. An example of keyboards falling into this group is U.S. Pat. No. 4,897,649, issued to Stucki on Jan. 30, 1990. The Stucki patent describes a keyboard in which multiple sets of two or more keys are mounted on a common base and arranged such as to be comprehended and operated by a single finger. The base is configured to provide separate areas for the right and left hands and a rest for the heels of the hands. The keyboard described by the Stucki patent is typical of keyboards falling into the chordic alternatives group which suffer from the same relearning disadvantages as keyboards falling into the alternative layout group. Furthermore, this class of keyboard requires an increased number of strokes per word, and thus productivity is inherently reduced.

Accordingly, there remains a need in the art for a keyboard that minimizes the strain and effort associated with undesirable postures and motions of the hands, wrists, and arms in typing the alphanumeric keys. Further, it is desirable to provide such a keyboard that simultaneously reduces typing inaccuracies and maintains or increases typing speed while minimizing the need for relearning. Still further, it is desirable to provide a keyboard that minimizes strain and effort of use resulting from the increased usage of specialized function keys and/or auxiliary keys on modern keyboards.

SUMMARY OF THE INVENTION

The present invention provides an improved keyboard for interacting with a data processing device. The keyboard includes an alphanumeric key array having a home row of keys constructed for providing a reference position for the fingers of the operator. Preferably, each alphanumeric key array has an orthogonal arrangement, i.e., with keys arranged in a plurality of rows and columns. The keys in each row substantially lie in a plane with the planes for the various rows being substantially parallel (for a given key array). The keys in each column lie in a plane, with the planes for the various columns being substantially parallel to each other (for a given key array) and substantially orthogonal to the planes of the rows. In one embodiment, the columns of the alphanumeric keys lie in planes substantially parallel to the sagittal plane of the user, (i.e., approximately along a proximal-distal axis, or substantially parallel to the direction the keyboard operator is normally facing). The keyboard also includes a function key array that is elevated (relative to the work or support surface) above the reference position defined, relative to the support surface, by the upper surfaces of the home row keys, and is tilted toward the operator. In one embodiment, the alphanumeric keys are in a concave array and thus the reference position is a surface which is curved with respect to the support surface.

In an alternative embodiment of the invention, the keyboard includes an alphanumeric key array having a home row of keys constructed for providing a reference position for the fingers of the operator. The keyboard also includes an auxiliary orthogonal array of keys that are elevated with respect to the home row of keys and angled thereto and are positioned for manipulation by the side of the thumb of the operator.

The keys of the thumb array use keycaps which provide a terraced topography. One purpose of this terracing is to allow each key to be depressed comfortably with the side of the thumb without inadvertently depressing another key in the thumb array. A second purpose of the terracing is to provide tactile feedback of thumb location. Still further, the auxiliary array of keys may include at least first and second elongated keys positioned and aligned generally along a line defined by the position of the operator's relaxed thumb when the fingers are in the reference position. These first and second keys are preferably constructed to move normal to the local surface of the keyboard (i.e., to the region of the keyboard surface close to the key) between first and second positions and to be depressed by the side of the thumbs. Preferably, the first and second keys have different keycaps for tactile identification.

In a further embodiment, a fifth row of keys is provided. Preferably, the two fifth row keys proximal to the thumb are assigned cursor movement functions.

In one embodiment, one or more foot switches can be used to control the function of one or more of the keyboard keys or to simulate the action of a particular key or to simulate the action of a mouse "clicker" button. In one embodiment, a foot switch can be used to remap all of the keys in one half of the keyboard to the corresponding keys in the other half of the keyboard to facilitate one-handed typing. Alternatively, other switches than a foot switch can be used for revamping keys such as dedicated keys, programmable keys or voice-activated commands. In one embodiment, a remote keypad, physically independent from the main keyboard, can be attached thereto. Preferably, the remote keypad is designed for operation by a single hand and can correspond to a numeric keypad, a numeric keypad with additional function and/or auxiliary and/or cursor keys, or to one-half of the normal keyboard. Preferably, a plurality of the keys, and as many as all keys in the keyboard are programmable so that any key can be programmed to perform the function of any other key, key combination or macro, preferably by using a two-key programming combination to avoid inadvertent remapping.

DESCRIPTION OF THE PREFERRED EMBODIMENT

Figure 1:
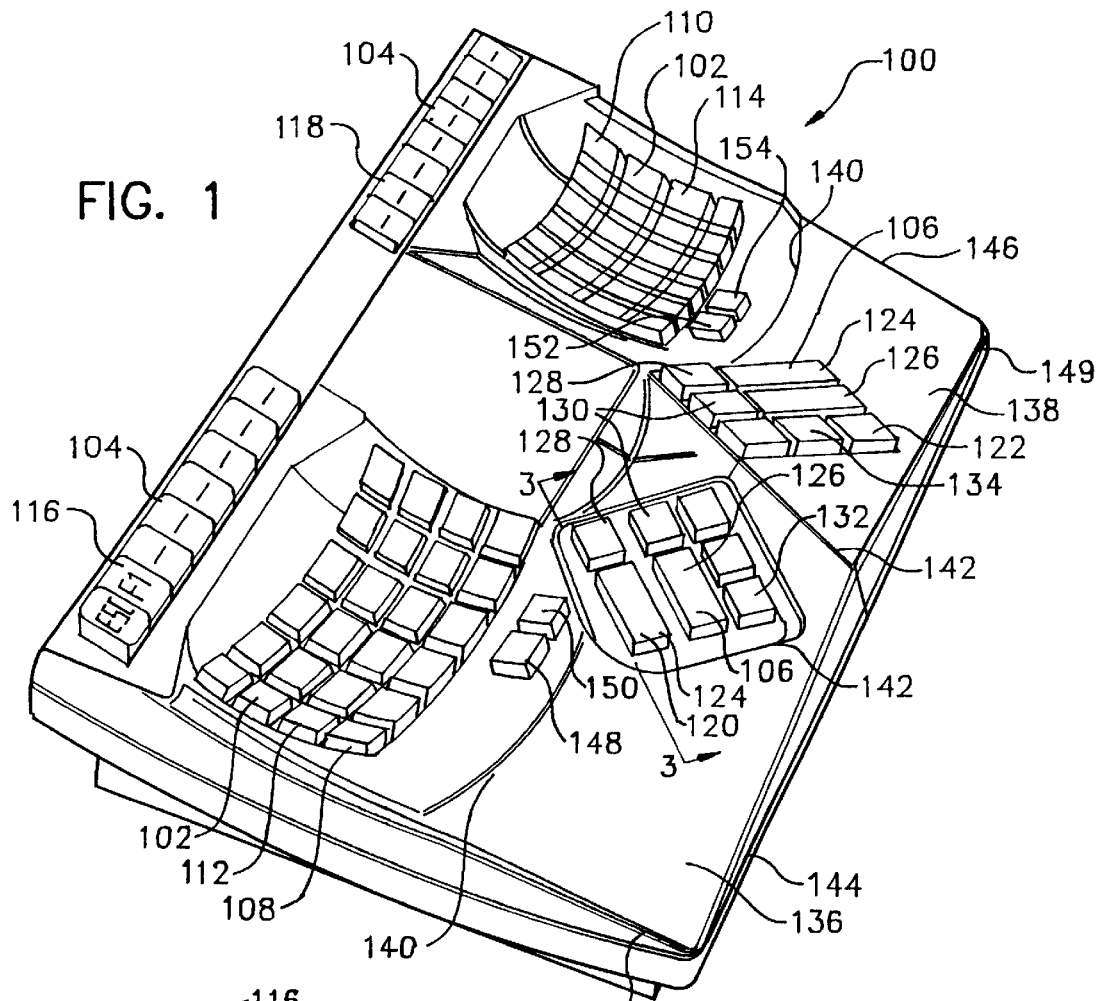
FIG. 1 is a perspective view of the ergonomic keyboard of the present invention.

An improved ergonomic keyboard 100 for use with a modern computer (not shown), such as a standard personal computer, includes a plurality of alphanumeric keys 102, a plurality of function keys 104, and a plurality of auxiliary keys 106. It will be apparent to those skilled in the art that although the invention is described herein by reference to a keyboard 100 for use with a standard computer (not shown), the keyboard of the present invention could be used for data entry in combination with any data processing apparatus. As examples, the keyboard of the present invention could be used in combination with: control panels such as those found in aircraft, automobiles, and military apparatus; video games; electronic musical instruments; nonstandard keyboards; etc.

The alphanumeric keys 102 include all the ASCII-character-generating keys of the standard four rows in a conventional computer keyboard, arranged in an array having the standard QWERTY layout. As is known in the art, the alphanumeric keys 102 are provided for identifying and entering alphabet characters to the standard computer (not shown) with which the keyboard 100 is used.

In one embodiment of the invention the alphanumeric keys 102 are separated into first and second arrays 108 and 110 positioned for manipulation by the left and right hands of the operator, respectively. The area 160 intermediate the first and second arrays 108 and 110 is preferably constructed for storage. The storage provided in the area 160 may be used by the operator for accessories or other items.

The first and second arrays 108 and 110 are each arranged in an approximately orthogonal, concave array. However, while columns are well aligned, rows are somewhat curved to reflect the different length of fingers. Thus, the key columns for the ring finger 13 and middle finger 14 are generally more distal from the operator than the other columns. This offset is typically ¼ to ⅔ of a keycap width. In one embodiment, the home row keys are angled downward away from the user slightly, between about ½° and about 4°, when the keyboard is on a level surface so that the function keys are at an angle with respect to the home row keys which is about 2° greater than the angle of the function keys with respect to the support surface. The precise attitude and position of a keyswitch base on a faceplate in which the keyswitch is to be mounted may be determined by the chart in Appendix A. The precise attitude and position of the keytops according to first and second embodiments is determinable by the charts of Appendix A in combination with the keycap style. According to one embodiment, the keycap style is the cylindrically sculpted style used in conventional PC keyboards, with the exception that the four home row keys use spherically sculpted keycaps for improved detection of the home row.

For purposes of understanding the present invention, it is useful to understand the distinction between a key and a keycap. The key is the switch and supporting mechanism detectably activated by the user. The key switch is typically activated in response to pressing or movement in a first direction of activation. Some switches are constructed to permit variance in the activation direction so that the key may have a slight angled or lateral movement. In addition to lateral activated keys, some keys are also activated by a pivoting key switch, i.e., in which the motion is substantially arcuate. In addition to mechanical switches, other types of switches such as membrane switches, electronic switches and the like can be used for interacting with the computer.

The surface which the user presses to activate the key can be provided as a separate piece which fits on top of the key switch, known as a keycap. When the key is a linear activated key, the surface of the keycap which the user presses is substantially at right angles to the direction of activation in most cases, although the surface may be non-planar, such as being concave or convex, or having bumps, ridges, or other tactile indicia. It is also possible for the pressed surface of the kepcap to be substantially non-perpendicular to the direction of activation. In the case of a concave key, the surface of the keypad can be defined by the plane passing through the corners of the keypad or by the plane tangent to the keycap surface at the location of the key switch. It is also possible for the keycap to be pivotally mounted, i.e., so that the keycap follows an arcuate trajectory upon being pressed. Pivoting keycaps can be used in connection with both linear activated keys and pivoting keys. It is possible to use either linear travel keys or pivoting keys for the various keys in the keyboard. However, to achieve the desired ergonomic effect, it is preferred that at least the alphanumeric keys be linear-travel keys. In some embodiments, keys with low or zero travel are used to help reduce stress and increase speed.

In considering the location and movement of the keys, it is convenient to define the direction of key activation as an angle with respect to a surface, such as the support surface on which the keyboard rests (which will typically be horizontal). Similarly, when considering the occasion and, particularly, the elevation of keys and/or keycaps, it is convenient to describe the location as a height above the support surface.

In one embodiment, keyswitch model MX1A from Cherry Electronics Corporation, Waukeegan, Ill., can be used. Such key switches can be positioned in a concave configuration using apparatus and method described in, for example, U.S. patent application Ser. No. 07/931,736, filed Aug. 18, 1992, for KEYBOARD AND METHOD FOR PRODUCING.

Figure 21:
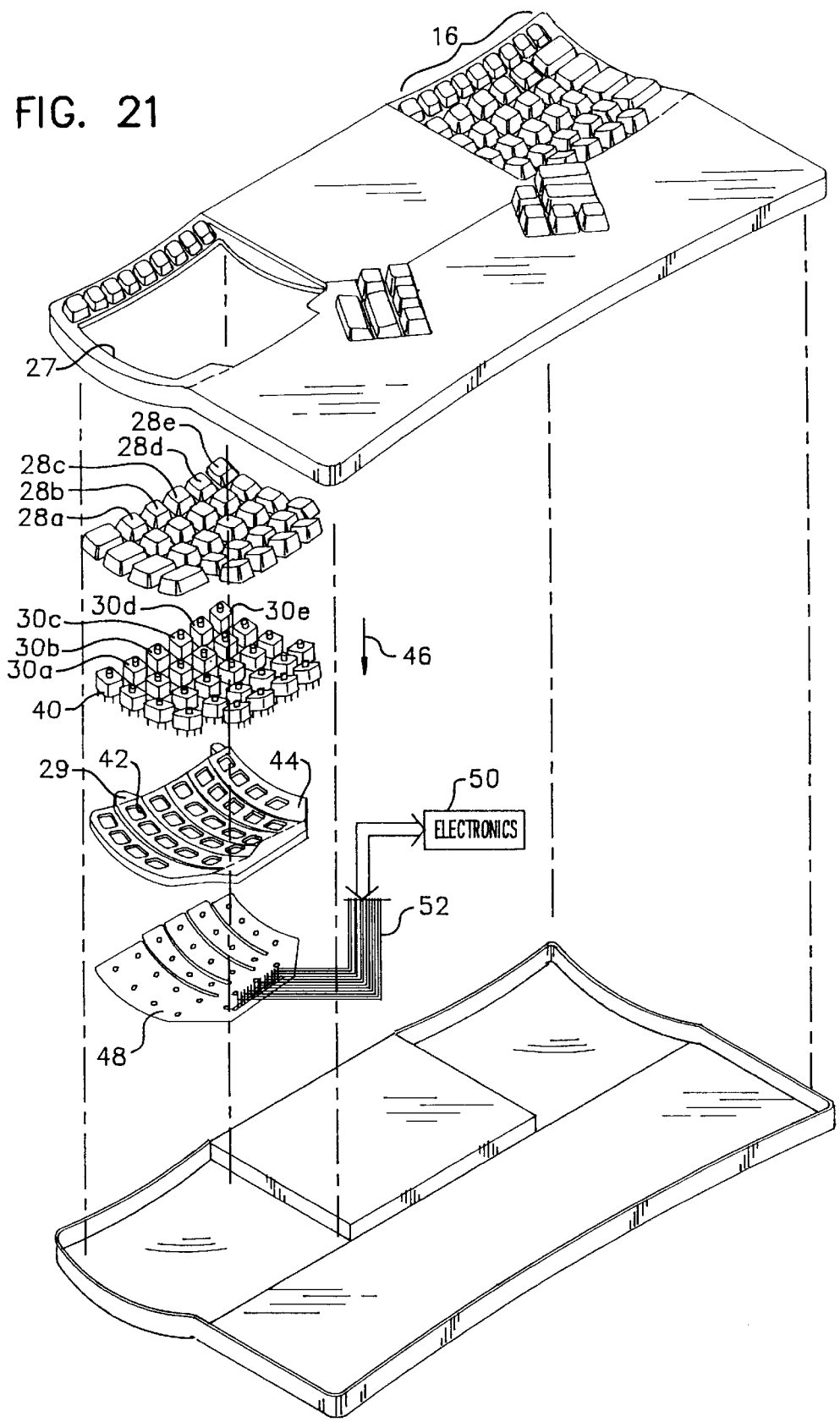
FIG. 21 is a perspective exploded view of a keyboard according to one embodiment of the present invention.

FIG. 21 provides an exploded view of one 14 of the two concave key arrays. The second concave key array 16 preferably is also formed in the same fashion as the first array 14, i.e., as depicted in the left portion of FIG. 21. As seen in FIG. 21, the individual keys 22 can be provided in two mateable portions, namely, a key cover and a key switch. For example, key 22a can be formed from key cover 28a and key switch 30a. Although FIG. 21 depicts mechanical key switches, other types of key switches well-known in the art can also be used, such as membrane keys.

When mechanical switches 30a–30e are used, detection of a key press is performed using electrical contacts 40. A number of mechanical switches can be used. One type of mechanical key switch that can be used is type MX1A available from Cherry Electronics Corporation, Waukeegan Ill.

In the embodiment of FIG. 21, the keys are held in holes 42 formed in a plate 44. The plate 44 has a double concave shape which establishes the double-concave configuration of the keys, described above. The plate 44 is mountable in an opening 27 in the chassis 80, e.g., using tabs 29. In the embodiment of FIG. 21, the key switches 40 are inserted into the plate 44 in a direction 46 which is toward the interior of the keyboard 12. In one embodiment, the key switches 30 include adaptations such as tabs, slots or latches for connecting the key switches 30 to the plate 44 by engagement with the edges of the holes 42, preferably by a snap action.

The key caps 28, plate 44 and chassis 80 can be made from a number of materials. Preferably, high-impact plastic is used, although it would also be possible to use other materials such as metal, composites, fiberglass and the like.

When the switches 30 and plate 44 are assembled, the contacts 40 protrude downward from the bottom surface of the plate 44. A circuit board 48 provides electrical connection between the electrical contacts 40, for ultimate coupling with electronics 50, e.g., via a bus 52 (as described more fully below).

Figure 13:
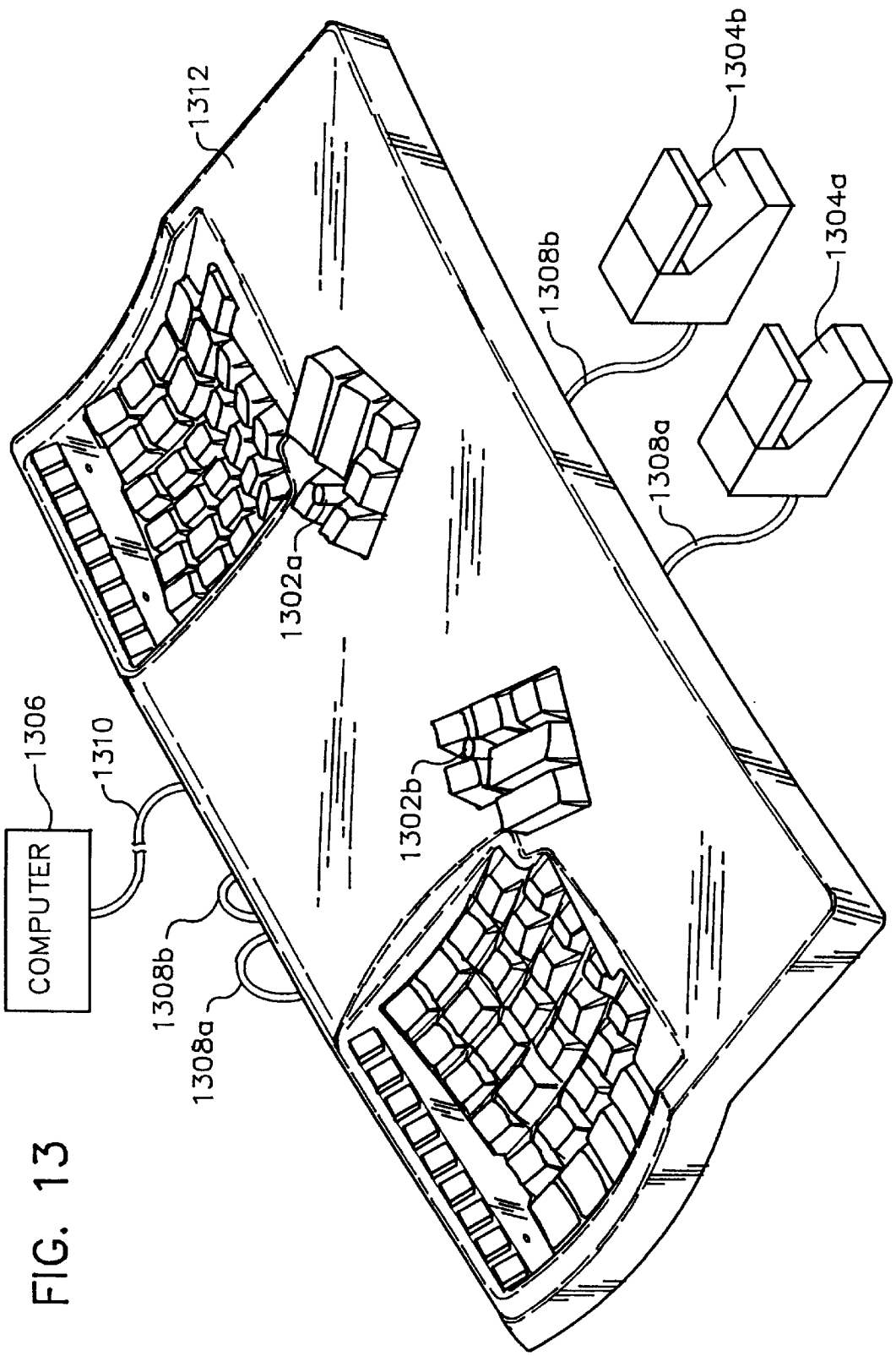
FIG. 13 is a perspective view of a keyboard, attached foot switches and attached computer (in block form) according to an embodiment of the present invention.

The present invention can be used in connection with a number of types of keyboards for a number of purposes. One example is a keyboard for use with a computer, such as that described in "Personal Computer AT Technical Reference", *IBM Hardware Reference Publication* 6139362/6280070 (1985). Briefly, according to one embodiment, the key matrix 54 (FIG. 22) is coupled, via a bus 52a through a sense amplifier 56 to a keyboard controller and scan code buffer microcomputer 58. The microcomputer 58 scans the key matrix 54 via a buffer 60 and NOR gates 62. The microcomputer 58 outputs scan codes and receives clock and data signals via the keyboard buffer 64. A J22-type connector 66 is used for communicating with the system board of the computer over a cable 1310 (FIG. 13). The microcomputer 58, via invertor circuit 68, controls the status of indicator lights.

Figure 22:
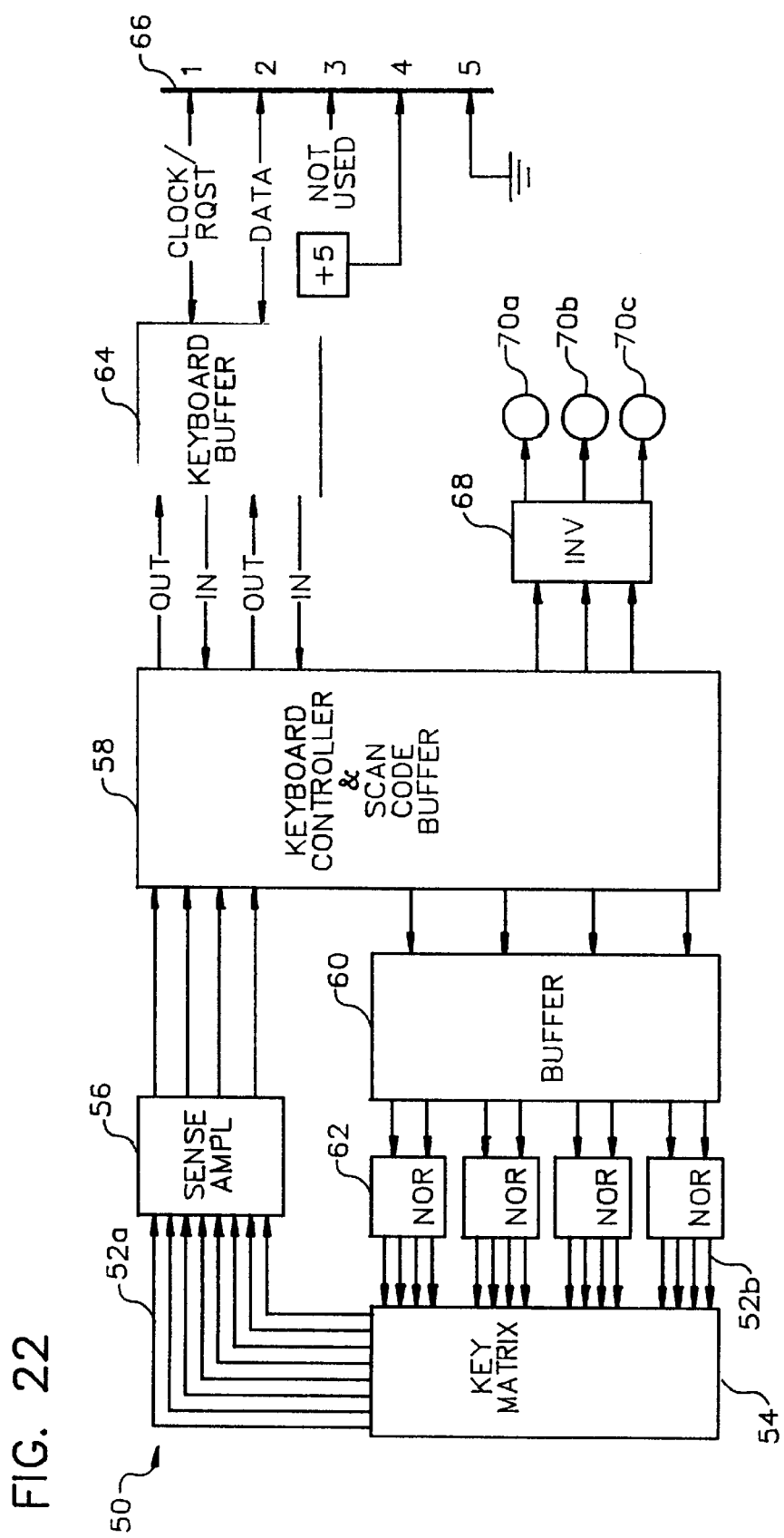
FIG. 22 is a block diagram of electronics for a keyboard for one embodiment of the present invention.

Although the electronics depicted in FIG. 22 are described in connection with an AT-type keyboard, the present invention can be used with other types of keyboards, including a PC/XT-type keyboard, a MacIntosh-type keyboard as well as keyboards provided for purposes other than computer I/O, such as keyboards for games or other amusements, musical instruments, vehicle, weaponry, machinery or other equipment control and the like.

Figure 23:
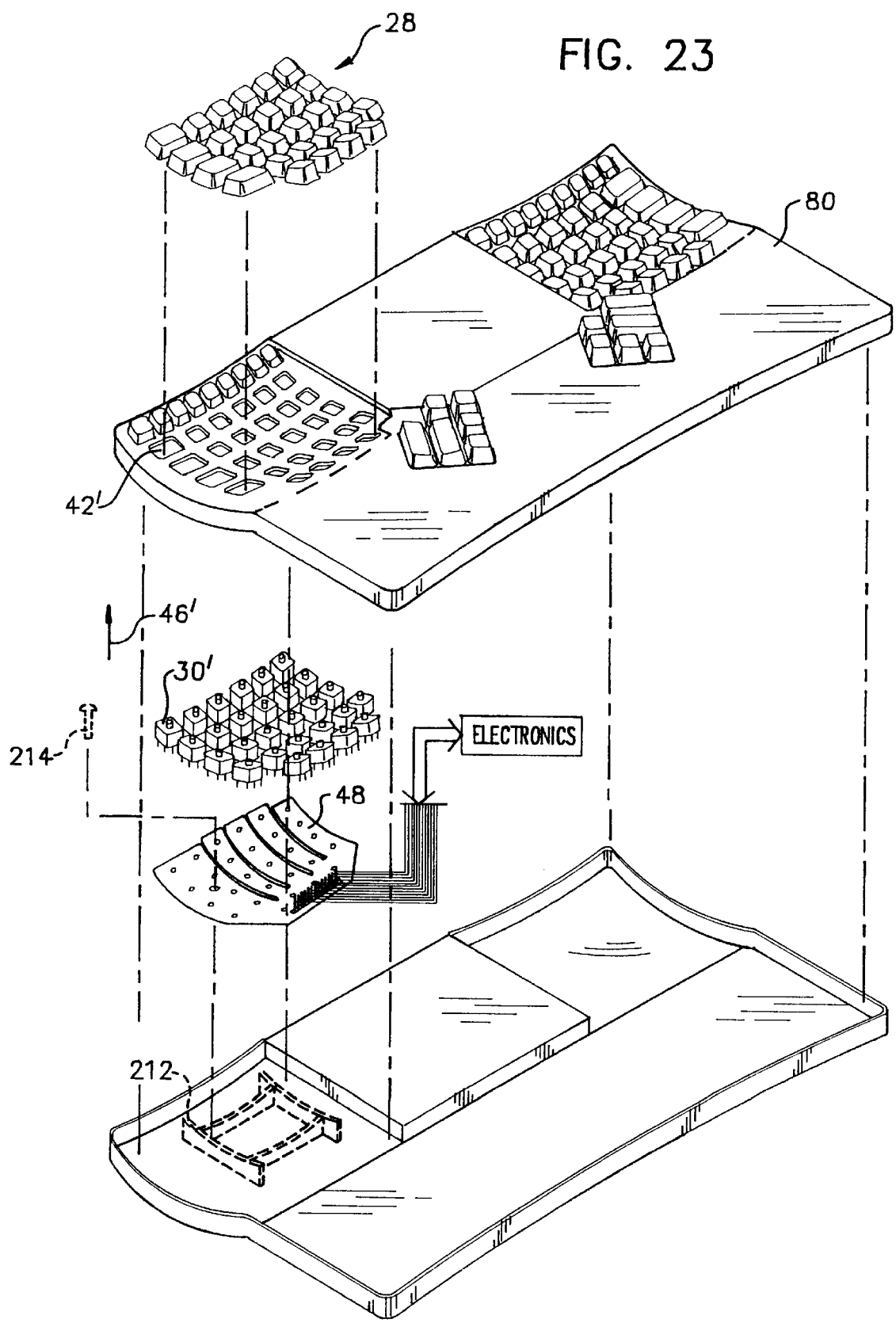
FIG. 23 is a perspective exploded view of a keyboard according to one embodiment of the present invention.

FIG. 23 depicts another embodiment of the present invention which the holes 42' for receiving the key switches 30' are formed in the chassis or case 80 of the keyboard, thus eliminating the need for a separate non-integral plate 44. FIG. 23 also illustrates an embodiment in which the key switches 30' can be inserted through the holes 42' in a direction 46' opposite to the direction of insertion 42 illustrated in FIG. 21, i.e., in a direction from the bottom or interior surface of the chassis top 80 toward the top or exterior surface. An advantage of this configuration is that it would allow the key switches 30' to be attached to the circuit board 48 while the circuit board is in a flat configuration, e.g. before the keys are placed in the concave configuration by insertion through the holes 42'. Coupling the key switches to a flat-configured circuit board is less labor-intensive than coupling to a curved circuit board or simultaneously flexing and coupling the circuit board (which are among techniques that can be used, e.g. in connection with the embodiment of FIG. 21). Furthermore, coupling to a flat-configured circuit board can employ, e.g., wave-soldering so as to be more easily automated, i.e. performed by machine, without substantial human intervention, than coupling to a curved circuit board (although some degree of automation is possible with the curved configuration).

In another embodiment, which is particularly advantageous when used in conjunction with the flat-configuration coupling described above, the circuit board 48 can be supported from below, e.g. by upright blades 212 depicted in phantom in FIG. 23. The upright blades 212 can be formed of a number of materials, including metal, fiberglass, and composites, and preferably are formed of the same material as the chassis or case, 80 and are formed integrally therewith, such as by a molding process. In this embodiment, it is possible to use the blades 212 to position the circuit board 48 (and attached switches 30) in the desired configuration, such as a double-concave configuration, e.g by attachment with one or more fastening devices such as screws 214. Other fastening means such as latches, tabs, adhesives and the like can also be used. When the blades 212 are used to shape the circuit board and switches, it is possible to dispense with the array of holes 42, so that the user can access all the keys in the array through a single large opening, similar to opening 27 depicted in FIG. 21. It is currently believed that for this embodiment, it is useful to provide a circuit board which has somewhat greater rigidity than the circuit board used in connection with plate-supported key switches.

In one embodiment, the key switches are connected to a circuit board using soldering techniques. In another embodiment, soldering steps may be reduced or eliminated by employing other switch technologies. For example, rubber switches with plastic sleeves and caps or rubber switches with rubber caps (see FIG. 7) can provide for electronic sensing of key switch positions without the need for soldering. In one embodiment, the rubber switches are configured to bridge labyrinthine contacts 702, (FIG. 7) using a carbon pill 704 to short together the contacts. The components can be used in a switch as depicted or in a rubber switch as depicted or in a membrane-type switch. Additionally, force sensing surfaces and/or force-adjustable switches can be used to eliminate soldering.

The first and second arrays 105 and 110 include first and second home rows 112 and 114, respectively, which each comprise four home keys that define a reference position for the fingers of the operator. Although the alphanumeric keys 102 are described herein as arranged in first and second concave arrays, it will be apparent to those skilled in the art that aspects of the present invention may be readily adapted for use with a keyboard wherein the alphanumeric keys are positioned in either flat or concave form. In addition, the present invention may be used with the traditional diagonal arrangement of alphanumeric keys (FIG. 5) or with the non-standard orthogonal arrangement of alphanumeric keys (FIG. 6). Furthermore, an optional, not-QWERTY arrangement of keys is possible.

Figure 5:
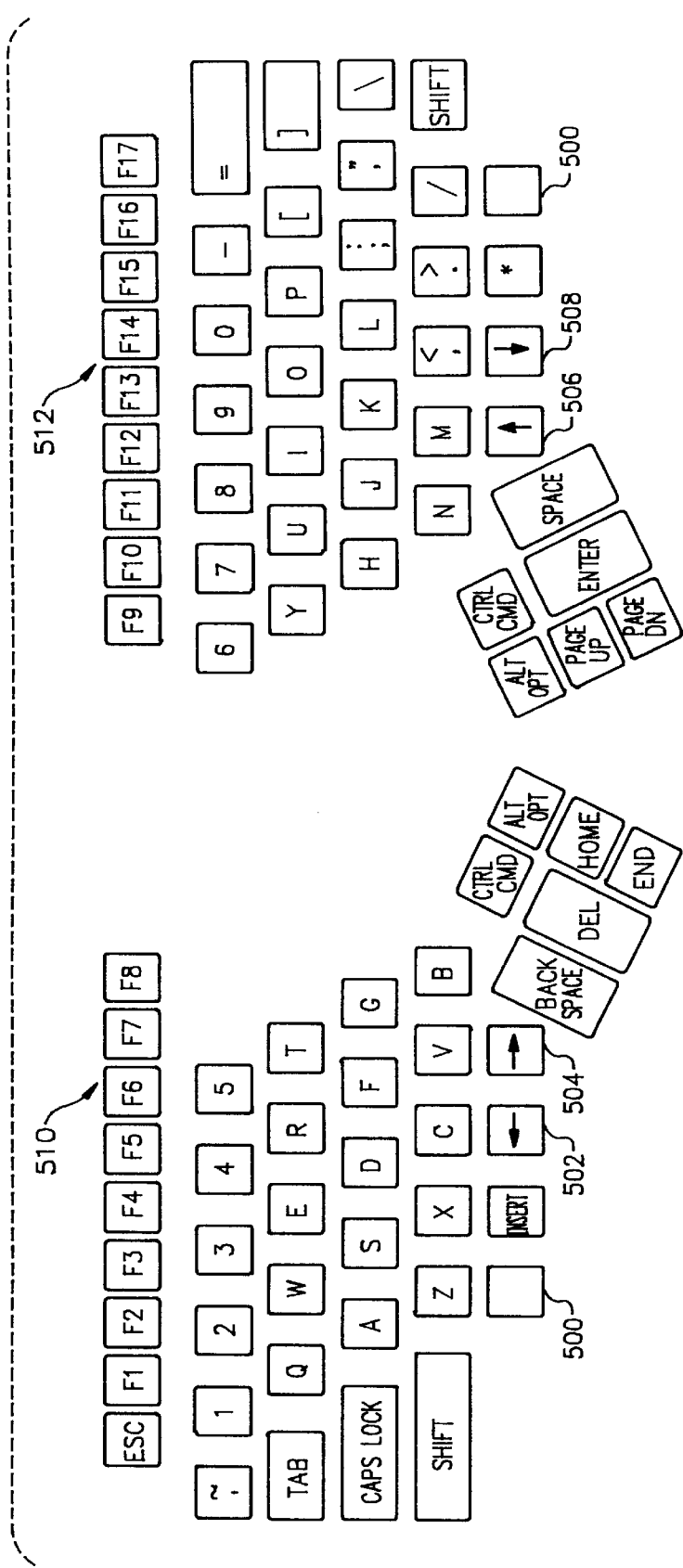
FIG. 5 is an alternative arrangement of keys, using a traditional diagonal array for alphanumeric keys (except that they are in separate left and right sections), but retaining the thumb keys, palm rest, plus elevated and tilted function keys.

A further advantage of the keyboard of the subject invention is the addition of a fifth row 500, illustrated in FIG. 5. In one embodiment of the invention, the medial two keys 502 and 504, on the left side 510, and 506 and 508 on the right side 512, respectively, are used for cursor positioning. Particularly, the inventors have determined that the medial keys 592 and 504 on the left side 510 are preferably used for left and right cursory movement as shown in FIG. 5. In similar fashion, medial keys 506 and 508 on the right side 512 are preferably used for up and down cursory movement.

The plurality of function keys 104 are typically provided for activating special functions rather than generating printable characters and are commonly used in combination with the auxiliary keys 106 or with the alphanumeric keys 102. It is preferred, for reliable usage, that these be separated spatially from the alphanumeric keys. However, they must also be easily accessible and must be comfortable if held down. As is known in the art, the plurality of function keys 104 are labeled at least F1 through F10, and typically F1 through F12 or more, and include additionally Escape (Esc), Print Screen (Print Scrn, F13), Scroll Lock (F14), and Pause (F15). Different hardware systems (i.e., Apple Macintosh vs IBM or compatible PC) and different software applications utilize different combinations of function keys, alphanumeric keys, and auxiliary keys. However, the most common combinations for an IBM compatible PC are either Ctrl or Alt used with a function key, F1–12. With an Apple Macintosh PC, the most common combinations are using the Option or Command keys with each other or with alpha keys or function keys.

The plurality of function keys 104 are preferably arranged in first and second arrays 116 and 118 for manipulation by the left and right hands of the operator, respectively, wherein each array includes a plurality of keys. The keys of the first and second arrays 116 and 118 may be arranged in a linear fashion of one or more horizontal rows which are generally parallel to the reference position defined by the first and second home rows 112 and 114, respectively. In one embodiment, the keys of the first and second arrays 116 and 118 are arranged in a curvilinear manner, preferably, so as to form two spaced-apart concave key arrays, each array preferably being concave along two mutually perpendicular axes. In one embodiment, the keys of the first and second arrays 116 and 118 are spaced closer (e.g., ½ to ⅝ inch center to center) than the standard distance (¾ inch) for alphanumeric keys. The function key keycaps preferably have a greater length (i.e. along the proximal-distal axis) than width (i.e. along the left-right axis). Preferably, the ratio of length to width is about 1.4. In one embodiment, the function key keycap length is about 0.45 inches (about 1.2 cm) and the width is about 0.32 inches (about 0.8 cm). Also, as discussed above with respect to the first and second arrays 108 and 110, the first and second arrays 116 and 118 may be arranged for use with a keyboard having either a flat or concave alphanumeric array.

Figure 2:
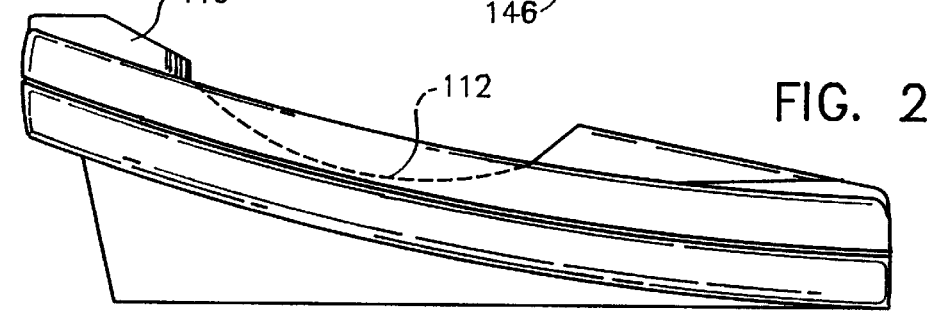
FIG. 2 is a side view of the ergonomic keyboard illustrated in FIG. 1.

To improve the comfort, speed, and accuracy with which the function keys 104 may be used by the operator, the first and second arrays 116 and 118 are elevated above the level of the reference position defined by the top of the keycap in the first and second home rows 112 and 114, and are tilted toward the user. The degree of tilt of the function key arrays 116 and 118 relative to the work surface (i.e. relative to the support surface, typically horizontal) can range from 15 degrees up to 60 degrees, preferably from about 40 to about 50 degrees and more preferably about 45 degrees. As also illustrated in FIG. 2, the degree of elevation and tilt relative to the first and second home rows 112 and 114 is preferably 3 to 5 cm and at least 35 degrees, respectively. For most applications, the degree of tilt toward the user should allow the finger to depress the key with minimal finger motion by simply moving the extended finger toward the key. If the keys are tilted too much, the fingernail will hit the key, which may be uncomfortable for the user. If the keys are not tilted enough, additional downward motion toward the work surface is required, which necessitates extra effort and decreases speed and accuracy. It will be apparent, however, that the foregoing values for preferred degrees of elevation and tilt are provided as illustrative examples and that some variation may be provided without departing from the true scope of the present invention.

The auxiliary keys 106 shown in FIG. 1 include a plurality of keys that are commonly employed with the conventional typewriter and/or computer key layout and that perform a function other than to enter an alphanumeric character. Examples of the functions performed by the auxiliary keys 106 include Space, Enter, Shift, Caps lock, Tab, Backspace, Control (Ctrl), and Alt, plus editing key (Home, End, Page Up, Page Down, and Delete). The Apple Macintosh computer also uses the Command (Cmd) and Option keys. In one embodiment, six keys are provided for each thumb as depicted in FIGS. 5 and 6. These six keys include Space, Enter and Backspace, plus editing keys (Page Up, Page Down, Home, End, and Delete), as well as Ctrl and Alt, or Cmd and Option. The auxiliary keys can be attached to a circuit board which can be slightly curved to achieve the configuration of the keys, as described more thoroughly below.

Figure 4:
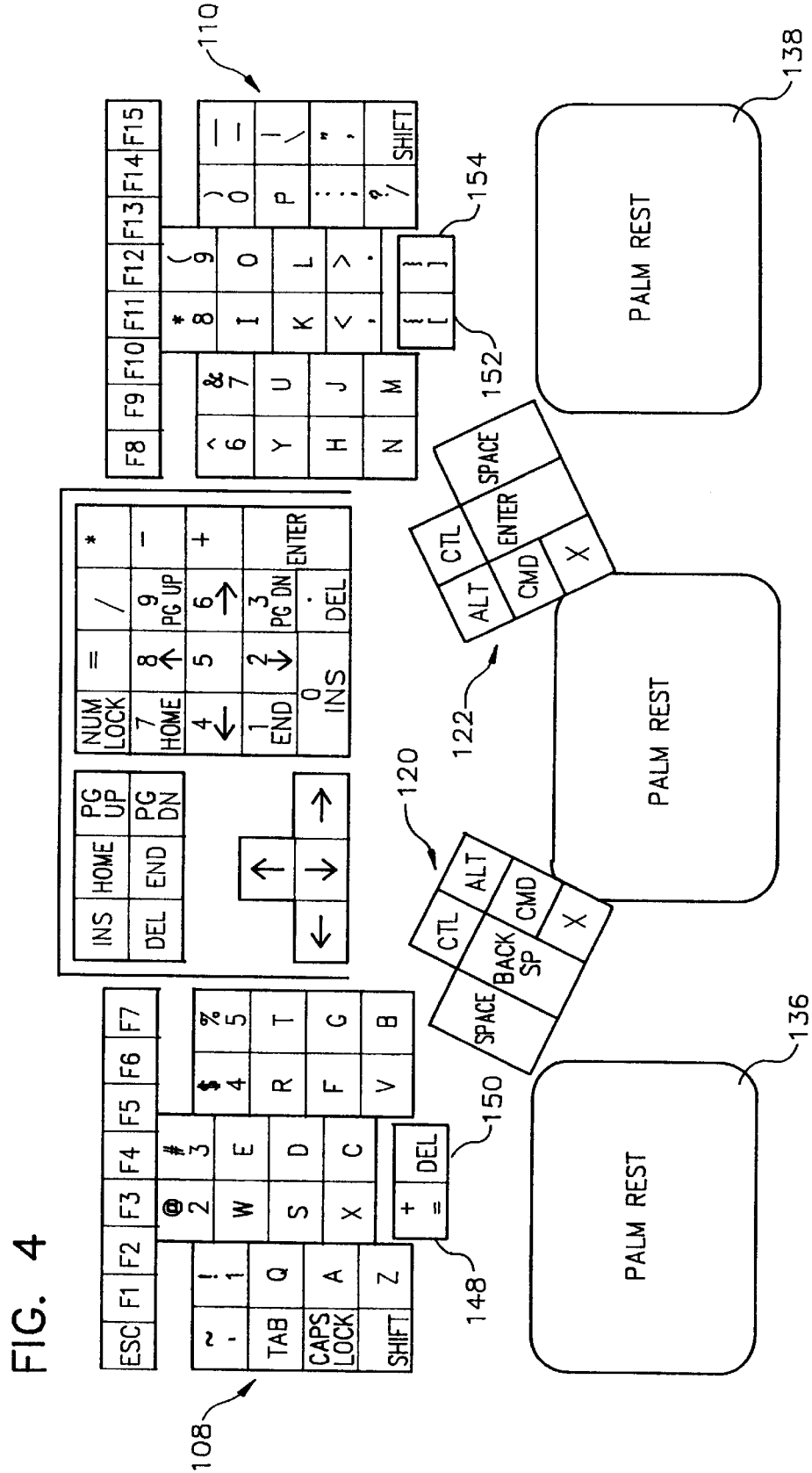
FIG. 4 is a plan view of the keyboard illustrated in FIG. 1 showing the layout of the keys thereof.
Figure 6A:
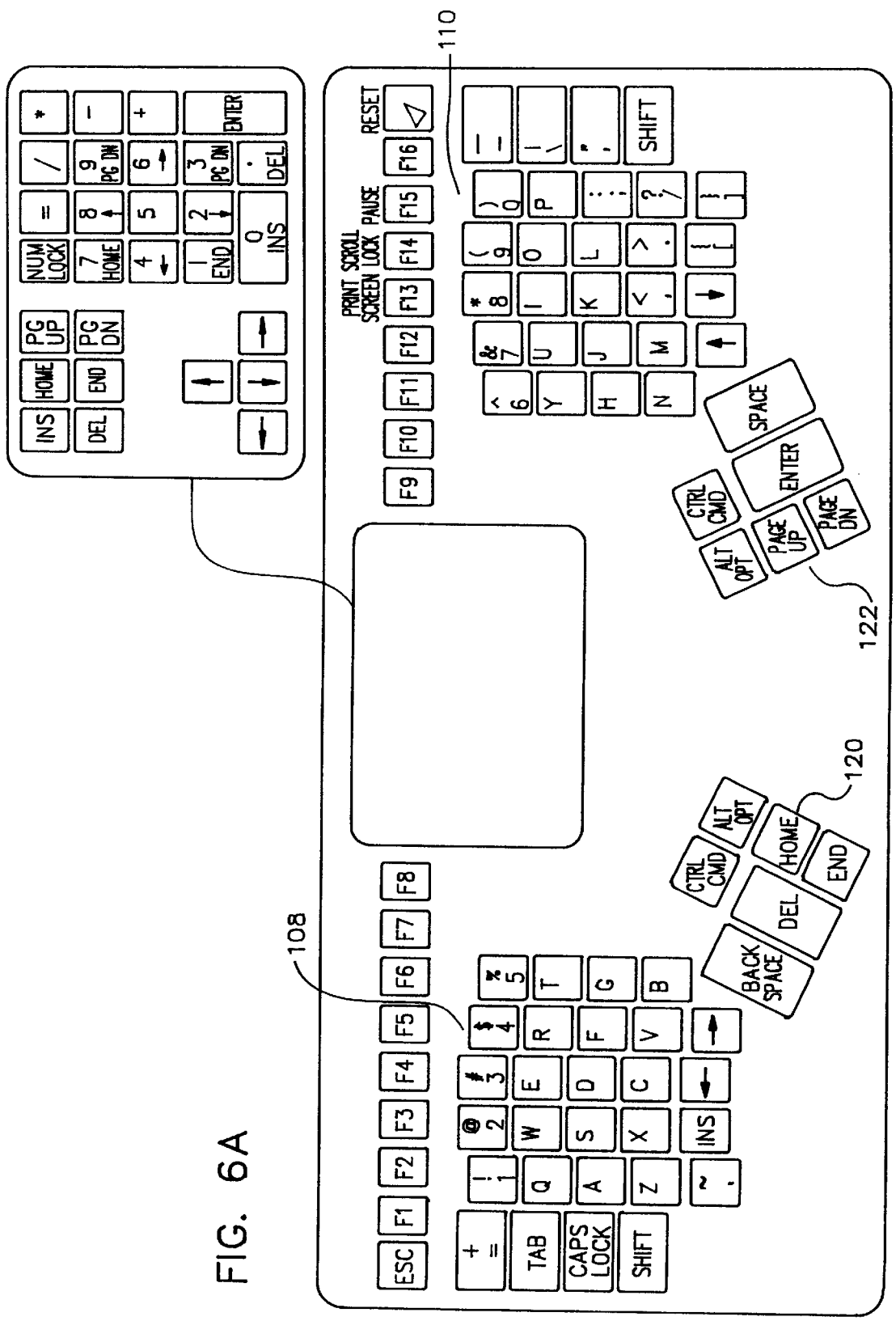
FIG. 6A is an alternative key layout with additional keys compared to FIG. 4.

The auxiliary keys 106 are separated into first and second arrays 120 and 122 for manipulation by the left and right thumbs of the operator, respectively. It will be apparent to those skilled in the art that it may be desirable to provide duplicate keys in both the first and second arrays 120 and 122 for performing the same function, e.g., Space, as shown in FIG. 4. However, one embodiment, shown in FIGS. 5 and 6, provides only one of each key for maximum versatility. Although FIGS. 5–7 show the key layout as if all keys lay in a plane, as. noted above, the keys may be non-coplanar, such as using the configuration shown in FIGS. 1, 2, 13–17. The keys of the first and second arrays 120 and 122 are elevated with respect to the reference position defined by the keycap tops in the first and second home rows 112 and 114. Preferably the first and second arrays 120 and 122 are nearly level relative to the supporting desk surface, or slope slightly up away from the operator (typically deviating approximately 10 degrees or less from the plane of the support surface, which is typically level and horizontal). With this attitude, the side of the relaxed thumb can comfortably depress the keys with minimal movement and effort. Previous usage of thumb keys in an orthogonal array (e.g., Malt, U.S. Pat. No. 4,244,659) required pressing the thumb keys with the tip of the thumb, which is considerably less comfortable, requires greater skill to accomplish without looking at the key, and does not "self-adjust" to different hand sizes in the manner of the present invention. Previous devices required a relatively long reach for the thumb and, in some devices, by placing the level of the thumb key below that of the palm when the user is in the ordinary typing position, required that the thumb reach downward in order to strike the keys. In the present invention, on the other hand, the thumb remains generally in the plane of the palm of the hand and the thumb keys are generally elevated with respect to the alphanumeric keys and generally extend upward from the surface which defines the palm rest surfaces.

The keys of the first and second arrays 120 and 122 are arranged in a generally orthogonal relationship, the axes of which are rotated with respect to the home row reference position. Preferably, the angle at which the keys of the first and second arrays 120 and 122 are rotated with respect to the reference position is approximately 10–30 degrees, and more preferably approximately 20–25 degrees from straight ahead relative to the operator. This rotation and slope relative to the home row and work surface, respectively, is useful in fitting the thumbs of most users comfortably along the length of elongated keycaps (e.g., space, enter backspace, delete, shown in FIGS. 5 and 6), and surprisingly accommodates operators with very small hands such as children (as young as approximately 7 years old) as well as adult operators with very large hands.

The first and second arrays 120 and 122 each include first and second elongated keys 124 and 126 which are positioned so that the thumbs of the operator are substantially parallel to their linear axis when the operator's hands are in the reference position. The positioning of the first and second elongated keys 124 and 126 make it easy for them to be depressed by the side of the thumb. An alternative assignment of these keys is possible, as shown in FIG. 4. Key assignments according to other embodiments are shown in FIGS. 5 and 6, wherein the location of keys for performing functions known in the art are illustrated.

The first and second array 120 and 122 also include first and second square auxiliary keys 128 and 130 aligned with the linear axis of the first and second elongated keys 124 and 126, respectively. Each of the keys 124–130 is constructed to move between first and second positions generally normal to the surface of the keyboard 100.

Figure 3:
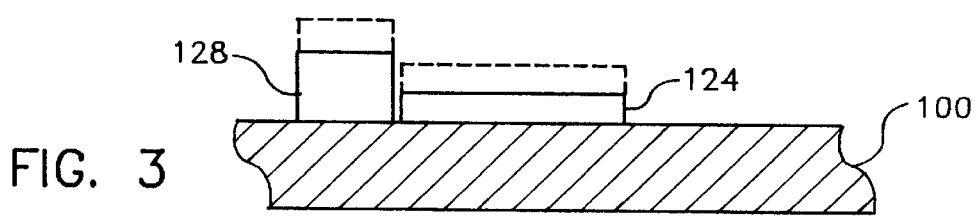
FIG. 3 is a partial sectional view taken along lines 3—3 of FIG. 1.

With reference to FIG. 3, the positions of the key tops for thumb activated keys in array 106 are terraced to allow easier depression without pressing more than one key at a time inadvertently.

Figure 8:
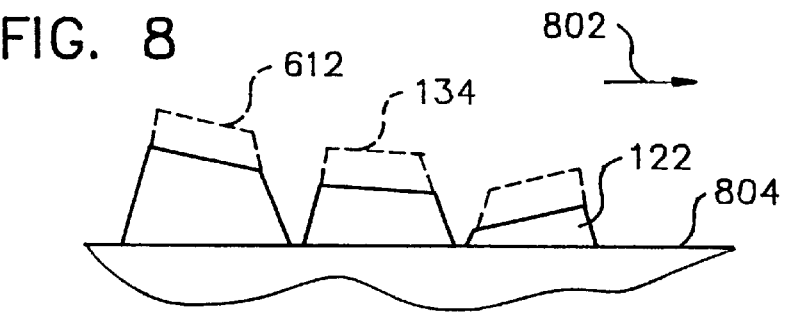
FIG. 8 is a partial cross-section taken along line 8—8 of FIG. 6C.
Figure 9:
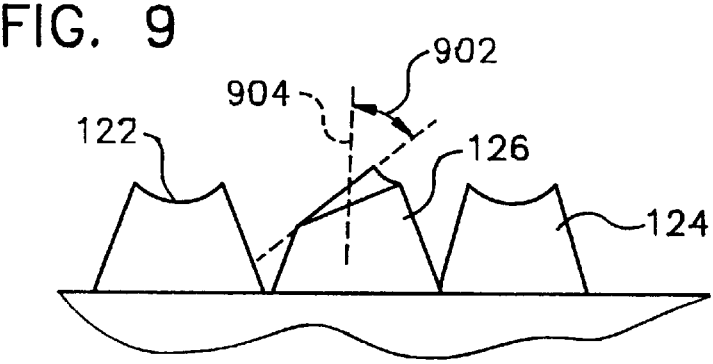
FIG. 9 is a partial cross-section taken along line 9—9 of FIG. 6C.
Figure 10:
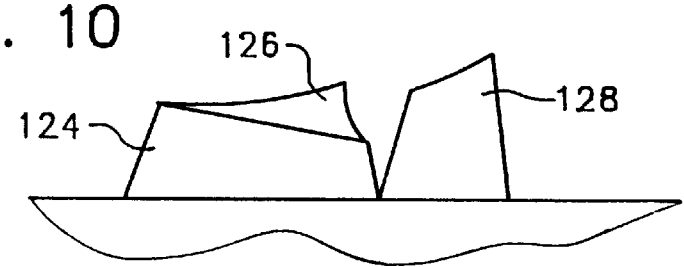
FIG. 10 is a partial cross-section taken along line 10—10 of FIG. 6C.

In addition, the second elongated keys 126 are preferably steeply sloped, e.g., at an angle 902 (FIG. 9) with respect to the direction of key activation 904 along their short axis so as to provide an upper surface which is angled with respect to the direction of key activation. The high side is adjacent to the first elongated key 124 and is higher than the top of said first elongated key. This allows the operator to more easily detect by touch if the thumb has strayed from the normal "home" position over the first elongated key. Square auxiliary keys 128 through 130, 612 are shown (FIGS. 3 and 8) to move between an open position (shown in outline) and a second actuated position. Similarly, the third square key 131 is shown to move between an open position (shown in outline) and an actuated position. In the embodiment of FIG. 3, the first square key 128 is positioned with its surface above the surface of the first elongated key 124 so that when the first elongated key 124 is in the open position (shown in outline), the first standard key may be depressed to the actuated position and its surface remain above the surface of the first elongated key. In the embodiment of FIG. 8, the upper surfaces of keycap 612 and 134 are sloped downwardly in the proximal direction 802 with respect to the surface 804 from which the keys extend and the upper surface of the key 122 is sloped downwardly in a distal direction. However, the surface 804 from which the thumb keys 612, 134, 122 extend is sloping upwardly in a distal direction with respect to the support surface so that, with respect to the support surface, the height of the top of the kepcap of any activated thumb key is greater than the height of the upper surface of the keycap of the next proximal thumb key which is in the open position. Positioned in this manner, the first, second, and third square auxiliary keys 128 through 130 may be easily manipulated by the thumb of the operator without inadvertent activation of the first or second elongated keys 124 and 126 or the other square auxiliary keys 131 or 132. Likewise, fourth square auxiliary key 131 is preferably positioned with its surface above that of fifth square auxiliary key 132, so that the former may be depressed by the thumb without inadvertently activating the latter. To avoid inadvertent key activation, it is not always necessary to avoid all movement of a key since a certain amount of key travel is required before the key becomes activated.

Figure 6B:
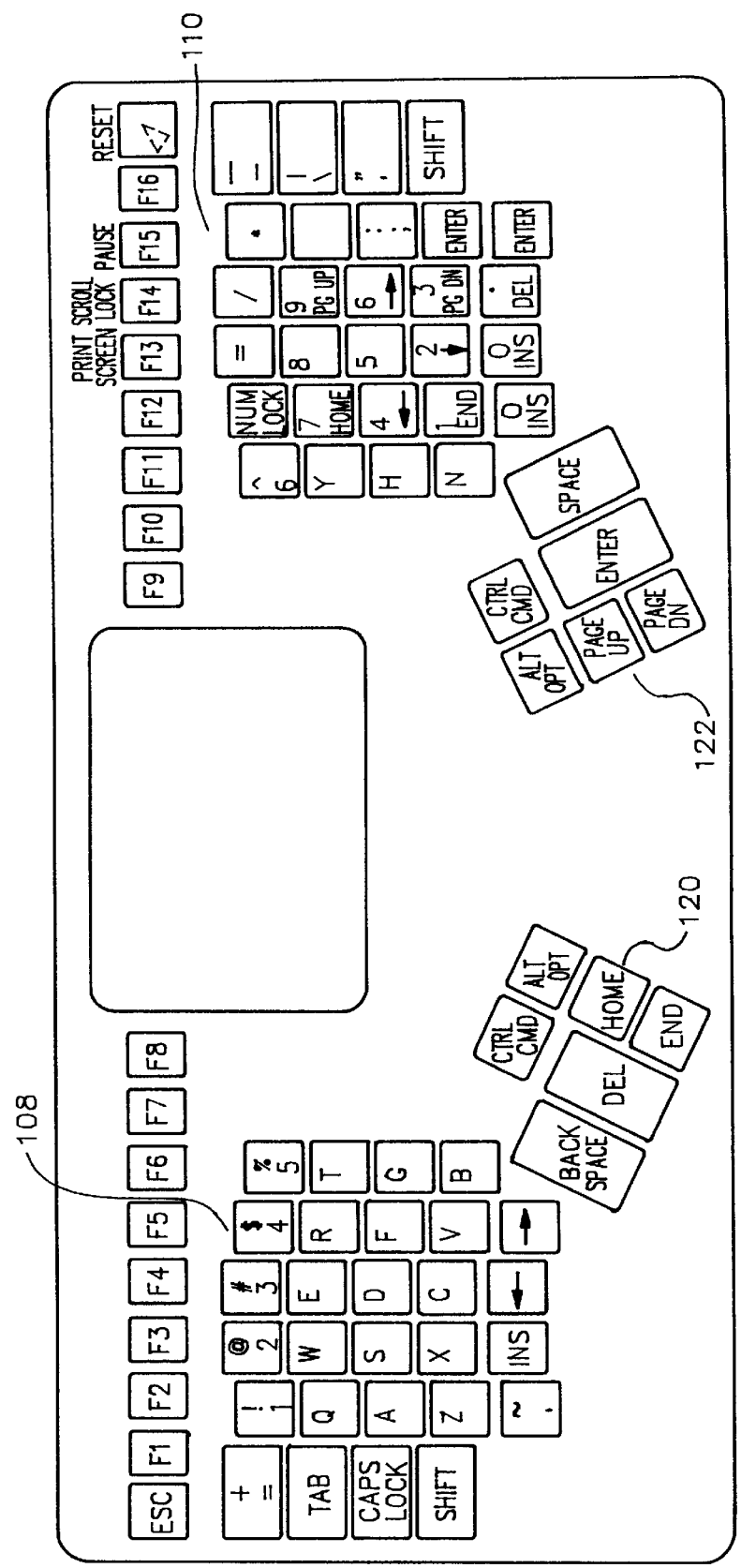
FIG. 6B is an alternative key layout.
Figure 7:
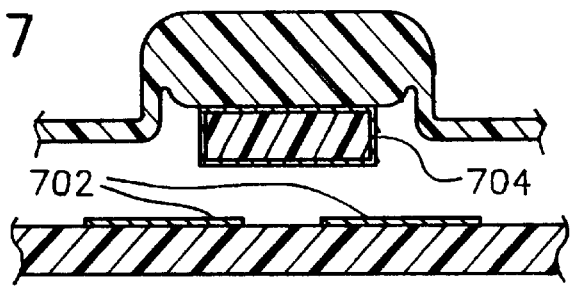
FIG. 7 is a view of a rubber switch.

In another embodiment, a column or orthogonal array of alphanumeric keys has alternative functions, termed "embedded keys," positioned for use by the fingers of either or both hands, as illustrated in FIG. 6B. In one embodiment of this type, embedded keys form a "10 key" array, e.g., for number-intensive data entry. The alternative action for the alphanumeric keys may be triggered by pressing a dedicated key (e.g., F16). In a further embodiment, the embedded 10-key, may be toggled on and off with a non-dedicated auxiliary key such as Caps Lock, Ctrl, or Alt. In this way, it is not necessary to hold down the triggering key (e.g. F16) or the toggle key in order to invoke the alternative action. Once the triggering key or toggle key has placed the keyboard in the "embedded 10-key" mode, the keys used for the embedded 10-key functions will have such alternative functions until such time as the "embedded 10-key" mode is disabled (e.g. by the F16 key or the toggle key, or upon re-boot).

Preferably, the user is provided with an indication of the embedded 10-key mode. In the embodiment depicted in FIG. 6C, an indicator light such as light emitting diode (LED) 652 lights when the keyboard is in "embedded 10-key" mode. Other indicator lights can be used for indicating activation of the Caps Lock mode or activation of the NumLock mode. The NumLock mode differs from the embedded 10-key mode by emulating the operation of a numeric keypad when the numlock mode is off (e.g. in which the "7" numeric keypad key provides the "home" function, the 9 provides the "Page up" function and so forth.

In addition to providing an indicator light, in one embodiment, the keyboard also provides one or more tones to indicate a change in state of toggle keys. The tone can be produced by the computer to which the keyboard is attached, but preferably the tone is generated internally by the keyboard itself, independent of any action by the computer. Providing such tones assists persons who may wish to receive audio feedback regarding state of the keyboard, including the visually impaired. Preferably, a tone code is used for distinguishing between a toggle on and a toggle off state. For example, the keyboard can be configured to provide two tones defining an ascending interval to indicate toggle on and two tones defining a descending interval to indicate toggle off. In another embodiment, one and off states are indicated by the number of tones (e.g., one tone means "off"; two tones means "on"). Different pitches or different tone qualities can be provided to differentiate between various toggle states when more than one toggle state is available. In one embodiment, the user can be provided with a key for interrogating the state or states of the keyboard.

Figure 6C:
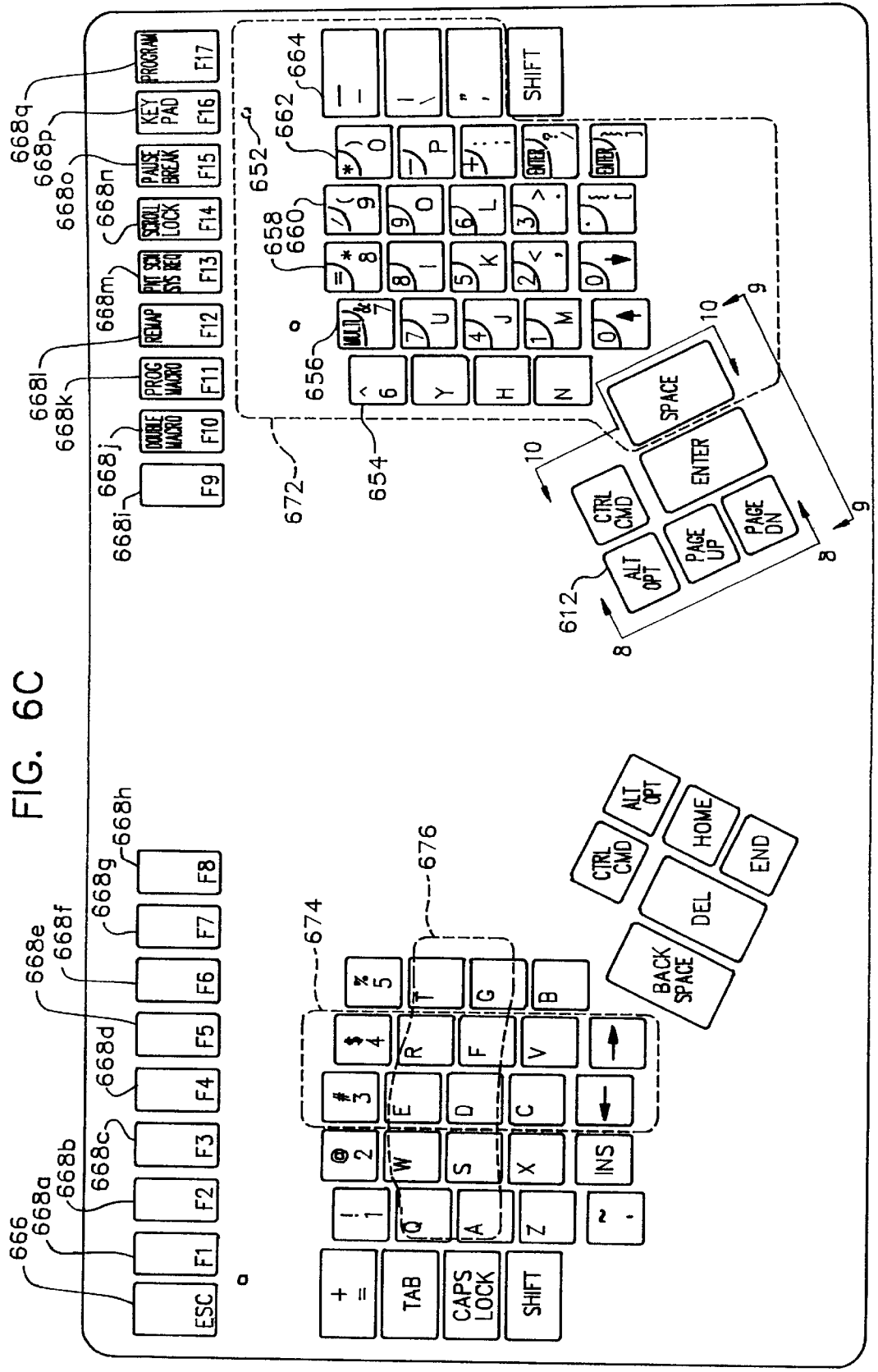
FIG. 6C is an alternative key layout.

Preferably, the keys used for the embedded 10-key mode are marked with indicia to indicate at least some of their alternative functions. In the depiction of FIG. 6C, an alternative function is indicated by the indicia in the upper left portion of the keycap, set-off by a dotted line. In one embodiment, the alternative indicia are shown in a contrasting color. Preferably, the same contrasting color is used for the indicia on the triggering key which indicates the trigger function of that key (e.g. "keypad" on the F16 key). Preferably, indicia are provided on the front surface of some of the keys which are sloped away from the user, including an indication of the primary key function, since these keys are positions so that the front keycap surface may be more visible to the user than the top surface.

Although the key row layout shown in FIG. 6C is staggered, when the right alphanumeric keypad is formed in a dished or concave shape, as depicted in FIGS. 1, 2, 13–17, the keys of the keypad are generally perceived by the user to be in an orthogonal configuration (i.e., mutually perpendicular rows and columns of keys), as opposed to the typical diagonal configuration of alphanumeric keys in previous keyboards. This contributes to simulating the feel of a 10-key adding machine when the "embedded 10-key" mode is in effect. In a typical 10-key adding machine, or in the dedicated numeric keypads of traditional computer keyboards, an elongated "Enter" key was provided, typically having a length (i.e. along the proximal-distal axis) about twice the width (i.e. along the left-right axis). In the embodiment depicted in FIG. 6C, this aspect of the "feel" of a 10-key adding machine is provided by designating two keys in the 5th column 662 as "enter" keys. This configuration preserves the feel of an enter key with a length which is twice the width, but still provides two different keys for selecting functions or alphanumerics when the keypad is not in "embedded 10-key" mode (in this example, "?," "/," "},", and "].") A similar simulation of a wide "zero" key can be provided e.g., by assigning two keys in the 5th row 663 to a zero function in the embedded 10-key mode. Providing an embedded 10-key keypad which is substantially orthogonal in layout (as perceived by the user) allows the 10-key mode to be readily used by persons trained on a 10-key adding machine (or a numeric keypad) with very little retraining, and so as to achieve corresponding or improved speed and accuracy of input. When the embedded keypad is provided in a configuration having some or all of the described ergonomic features (e.g., concave alphanumeric keys, elevated and angled function keys, angled palm rests and the like), the embedded 10-key keypad permits the user to enter data in a fashion simulating operation of a 10-key adding machine (or numeric keypad) with reduced strain and reduced potential for injury.

Although the embedded keypad is depicted, in FIG. 6C, on the right side, it can be placed in other locations, such as the left alphanumeric keypad, or both the left and right alphanumeric keypads.

Any of a number of the keys can be provided with alternative functions. In FIG. 6C, the second, third, fourth and fifth columns of keys 656, 657, 658, 660 and 662 are used for the "embedded 10-key mode." Any of a number of functions can invoked in the "embedded 10-key mode." In one embodiment, the invoked functions are those corresponding the functions invoked by a 10-key adding machine or by the number pad in a computer keyboard. However, unlike the 10-key keyboard and unlike the number pad of a computer keyboard, the keys are shared by at least two other functions. For example, as shown in FIG. 6C, the "top" key in the third row 658 (i.e. the key most distal to the operator) provides an "embedded 10-key" function of "=". However, this key is shared with at least two other functions in the sense that the same key is used for the "&" and "7" alphanumeric characters, depending on the state of the shift and/or shift-lock keys, when the keyboard is not in "embedded 10-key" mode. Preferably, the embedded 10-key keys are shared with a fourth function as well. The fourth function is the function which a typical computer keyboard number pad has while the "NumLock" mode is inactive (typically being toggled between active and inactive modes by a dedicated key, as in previous keyboards). This fourth function is not depicted in FIG. 6C because the fourth function is preferably not shown on the keycaps of these keys in order to avoid confusing the user with many indicia on each key cap, although indicia can be provided if desired. Providing the fourth function allows the embedded 10-key keys to operate similarly to the number key pad of previous keyboards, while sharing the keys with other functions such as the alphanumeric functions indicated in FIG. 6C. This provide ease of use for those users who have been trained on previous keyboards.

In one embodiment, the embedded key mode changes the function of 28 right-hand keys 672 and 10 left-hand keys 674. An alternative configuration of 10 left-hand keys 676 could also be used. Any other groups of keys on the keyboard could also be defined for embedded key use. Defining 10 keys in the lefthand side 674 or 676 is useful for those applications needing 10 lefthand keys for additional functions such as to simulate the L1 through L10 keys on the sun workstation or in mainframe terminal for IBM 3270.

An additional embodiment includes other keys which operate in an "embedded" mode. FIG. 6C shows a refined embedded key array consisting of a thumb key (Zero) and retaining the same cursor key positions as in the non-embedded mode. In a programmable version of this keyboard, additional keys around the numeric keypad and elsewhere on the keyboard may be separately programmable in the embedded mode. Thus, the user can choose to map the Zero key to either or both of the arrow keys, while moving the latter to the "H" and "N" keys.

In addition to using a toggle key to change the function of one or more keys (such as invoking the embedded 10-key mode), one embodiment of the invention used one or more foot switches. As depicted in FIG. 13, the foot switch has one or more paddles, buttons or other switch activators configured to be operated by the feet of a user. Although it is possible for the foot switches 1304a, 1304b to be connected directly to the computer 1306, preferably they are connected via cables 1308a, 1308b to input connectors 1502, 1504 (FIG. 15) such as RJ11 connectors. Another connector 1506 is provided for a cable 1310 for connecting the keyboard to the computer 1306. A number of pedal devices can be used, such as that sold by Kraft Systems of Vista, Calif. in connection with a trackball or that sold by Tandy Corporation of Ft. Worth, Tex. The foot switch can be active, i.e., can generate a signal for transmission to circuitry in the keyboard or in the computer (e.g., via a parallel port) or can be passive, e.g., defining a either a closed circuit path or an open circuit path (depending on the state of the foot switch) which can be interrogated and sensed by circuitry in the keyboard or the computer. In addition to toggling the 10-key embedded mode, the foot switch can be used to perform other functions such as shift, caps lock, control, alt, escape, enter, can be used to perform the functions of mouse or trackball "clickers" or buttons or can emulate any key on the keyboard. The foot switch allow users to re-allocate their work away from sore upper extremities. If the keyboard is programmable, foot switches can perform any single keystrokes or a combination (macro). In the default mode, the two foot switches perform the shift and F16 (keypad) functions. If desired, each pedal or switch can have more than two positions.

In one embodiment, operation of the foot switch serves to remap the keys on one-half of the keyboard to the corresponding keys on the other half of the keyboard. As can be done either in a superimposable mapping (i.e., such that the right index finger home key provides the same function as the left little finger home key) or a mirror-image mapping (i.e., in which the right index finger home key provides the function of the left index finger home key). This type of remapping is particularly useful for one-handed typing such as when the typist has only one hand that is fully functional for typing or in which the typist must rest a hand. Those operators trained in touch typing will be able to easily relearn one-handed typing, particularly if viewing the keys in the unused keywell while typing with the opposite hand and using the foot switch.

Providing multiple functions for each key, preferably in a toggling manner, is useful in accommodating uses of the keyboard in addition to the uses associated with operating a keyboard in conjunction with an IBM PC® computer or compatible computer. As noted above, embedded key modes are useful in conjunction with keyboards used in publishing. Further, many non-PC keyboards (e.g., those used in conjunction with Sun Microsystems computers, Digital Equipment Corporation computers, Wyse computers and IBM (non-PC) terminals use some different and/or additional keys. By using embedded key modes, optionally with foot switch switching, many or all of these uses can be accommodated using the same keyboard layout as described above. By providing electronics and firmware to emulate the operation of a variety of keyboards, a single model of keyboard can provide users of a variety of computers with the same ergonomic benefits (e.g. reduction of strain and injury, increased speed and accuracy, increased duration) as described above. By providing the keyboard with electronics for detecting the use of the keyboard and/or the equipment to which it is attached, this flexibility can be provided in a manner that is transparent to the user. To accommodate particular applications, it may be preferable to offer two or more rows of function keys. These can be provided in a tiered fashion, one above the other. In one embodiment, both rows are angled (with respect to the support surface) at about 45°.

In a further embodiment, additional keys (potentially all keys) are separately remappable in embedded mode. This allows such keyboards as those used in publishing, which may have as many as 140 or more keys, to be emulated with an ergonomic keyboards offering reduced reaching and straining. When only 10 additional keys may be included in the embedded mode on the left side, the preferred location is either the fourth and fifth five-key columns (beginning with the 3# and 4$ keys, respectively), or the second and third five-key rows.

According to one embodiment, the keyboard is provided with programmability resident in the keyboard itself. That is to say, functional features such as the key layout, stored macros, and repeat rate parameters are set and stored in non-volatile memory in the keyboard. In one embodiment, programmability is included in a circuit board obtained from Maxiswitch of Tuscon, Ariz. The way in which these features are set and changed can be important to operator success and acceptance. Preferably, the operator is not able to accidentally enter any of several "program modes," yet should be able to easily remember and enter the desired mode when programming is necessary. Preferably, the current key map for the keyboard is stored in the keyboard itself and not in the computer so it is available whenever the computer is turned on even if the keyboard is moved from one computer to another. In one embodiment, the keyboard stores approximately 2K bytes of information in onboard memory with 1800 bytes allocated to macros and the remainder allocated to key layout changes. In one embodiment, macros can be programmed into any key in the keyboard except F7 through F13, F16, F17, Control, Alt, and Shift.

According to one embodiment, a dedicated "Prgm" function key (e.g., F17, FIG. 6C) is employed. This "Prgm" key is pressed in combination with one or two function keys or auxiliary keys of the present invention. The use of F17 as a dedicated "Prgm" function key in combination with one or two other keys (function and/or auxiliary) makes it easy to purposefully utilize the various programmability modes, but makes it unlikely the programmability mode will be entered by accident.

The programmability mode is entered, e.g., by pressing the F12 key while holding down the F17 key to begin remapping the keys. The user can redefine a function of a key or of the foot switches by first pressing the key which is to be redefined, followed by pressing a key or key combination or series of keys or key combinations representing the alphanumeric characters or functions that will be the new meaning of the reprogrammed key. Pressing the F12 key again will exit programming session. Preferably, the user can remap all keys to their original (default) functions if desired.

When the programming key is used to define a number of key functions to be output, sequentially, in response to activation of a key or key combination, (i.e., a "macro") it is sometimes hopeful to provide a delay, e.g., to leave time for a program to load or for the purpose of executing a function before sending more keystrokes. According to one embodiment, a delay can be programmed into a macro. In one embodiment, the F17 (program) key combined with the F8 (delay) key, during programming of a macro, will cause a ½ second delay during the feedback of the macro. Repetition of the F17 plus F8 combination will create another ½ second delay in the macro. Preferably, the macro can also be programmed to include a pause, e.g., to allow the user to enter a variable. In one embodiment, holding down the F17 program key while pressing the F7 "field" key, establishes a pause. The pause can be terminated by pressing the F7 (field) key.

As depicted in FIG. 6A, a remote keypad, such as a numeric keypad is provided having the same variety of geometric features as the main alphanumeric keywells (e.g., concave configuration, generally orthogonal key layout). In addition, a pointing device (not shown in FIG. 6A, described more fully below) can be incorporated into the remote keypad, In one embodiment, the pointer device is positioned in the area otherwise occupied by auxiliary keys (thumb-operated). One or two foot switch ports on the keyboard and/or the remote keypad allow foot switches to emulate mouse button actions or that of any other key on the device.

Figure 18:
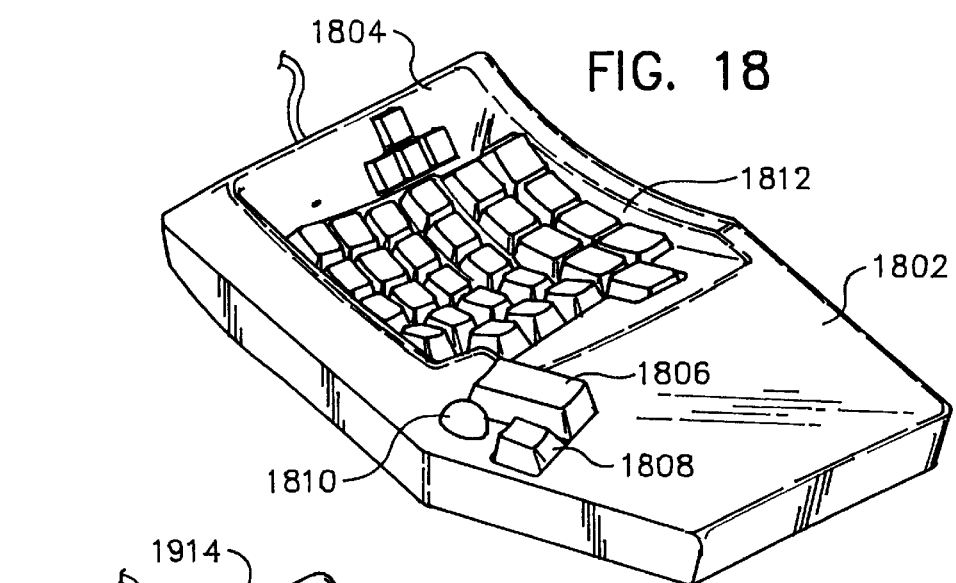
FIG. 18 is a perspective view of a remote keypad according to an embodiment of the present invention.

Additional keys beyond the traditional 20 numeric keypad keys may be desirable, especially for a programmable embodiment. These can be a block or column of full travel keys (equivalent to the column 6YHN for a right-handed remote keypad), such and Home, End, Page Up, and Page Down. As shown in FIG. 18, according to one embodiment, the remote keypad includes six columns of finger-activatable keys in a concave configuration distal to a palm rest area 1802. In the depicted embodiment, the auxiliary or thumb-activated array includes one elongated key 1806, one normal-sized key 1808 and a track ball 1810 located on the opposite side of the elongated key 1806 from the digit keypad 1812 and distal to the normal-sized auxiliary key 1808. Additional keys for a remote keypad can also be short-travel keys in the function key area. A desirable array of keys in this area is the "inverted T" cursor control array 1804.

Figure 19:
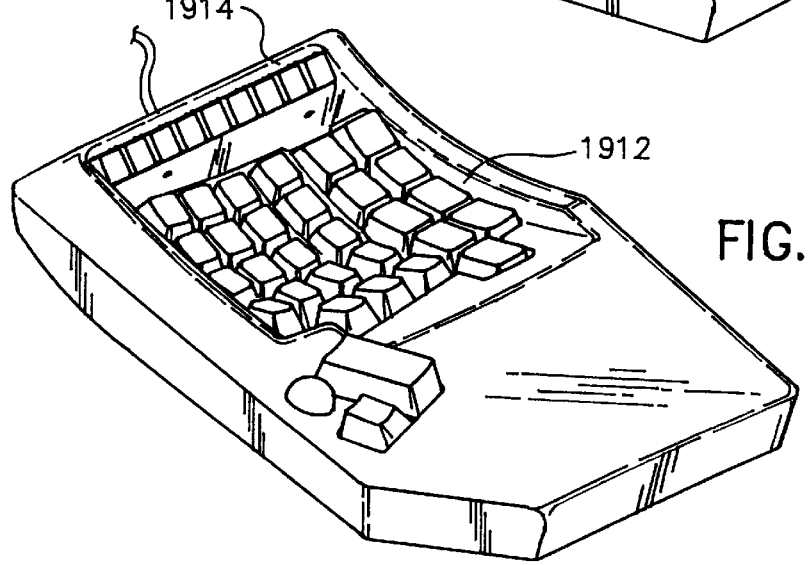
FIG. 19 is a prospective view of a remote keypad according to an embodiment of the present invention.

FIG. 19 depicts a remote keypad similar to that depicted in FIG. 18 except that the region which is above and distal to the main keypad 1912 is occupied by function keys 1914, preferably located and disposed, with respect to the main keypad 1912 in a fashion similar to the function keys with respect to the alphanumeric keypads in the configuration of FIGS. 13–17.

Figure 20:
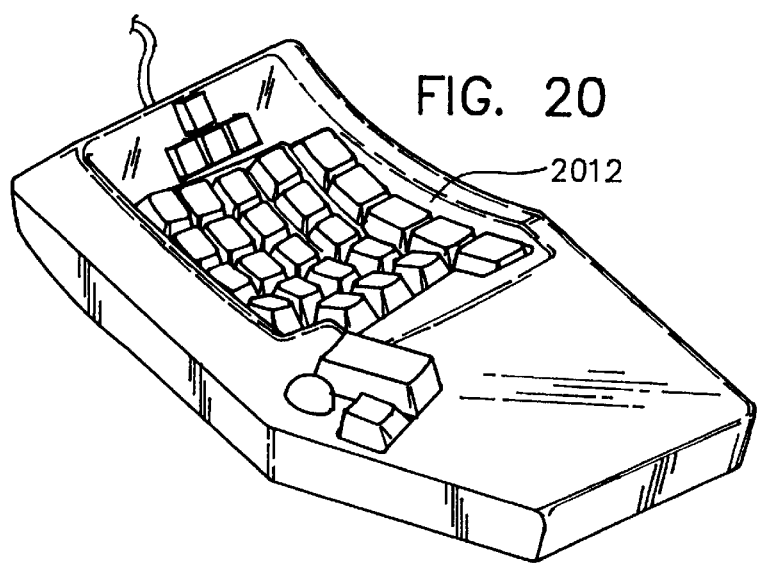
FIG. 20 is a remote keypad according to one embodiment of the present invention.

FIG. 20 depicts a remote keypad similar to the keypad depicted in FIG. 18 except that the main keypad 2012 contains only five columns rather than six columns.

The remote keypad can connect to the keyboard using standard keyboard connection means, although the standard IBM-compatible configuration would have the pointing device attaching directly to the computer. However, an especially desirable configuration is to have the remote keypad attached directly to the computer (e.g. through the parallel or serial port. This configuration can employ software and hardware available from Genovation, Inc, located in Irvine, Calif. The remote keypad can be used as a stand-alone ergonomic input device, with or without a complete keyboard.

In applications such as publishing where numeric input is not required but as many as 140 or more keys are employed, an ergonomic remote keypad as described can provide reduced strain and effort for typing compared to a traditional 140-key keyboard, for those operators who do not prefer embedded key arrays.

Keyboard operators who use a pointing device often suffer from strain or repetitive motion syndrome as a result of excessive use of pointing devices such as a mouse or trackball. An on-board pointing device (i.e. mounted on the keyboard or remote keyboard) can be useful in reducing strain and injury associated with excess use of the standard mouse or remote trackball. Onboard pointing devices exist in the industry with traditional stand-alone keyboards and portable (e.g. notebook) computers. However, previous pointing devices are not typically located where they can be usable with reduced strain and effort.

Because of the repetitive motion focused on the thumb, a trackball is not an ideal pointing device for intensive users. The alternative of using a mouse also causes extensive pain and injury among intensive users. According to one embodiment of the present invention, a small "joystick" which responds to lateral pressure in any direction can achieve the same function without requiring any significant movement. Because such a joystick can be easily adopted by most users of pointing devices, it is preferred over trackballs as an on-board pointing device. Such a device can be located for operation either by thumbs or fingers. In some embodiments, it may be desirable to include both a left and right-handed joystick. Preferably, the joystick has a height above the surrounding keys of about ⅛ inch. The joystick preferably has a normal attitude at about 90° to the surface of the keyboard from which it extends. In one embodiment, a joystick is used, produced by IBM or can be fashioned from a force-sensing film produced by Interlink of Santa Barbara, Calif.

Among the possible locations for a joystick, two locations offer great utility with the little strain and effort. According to one embodiment, the location for thumb operation is at the convergence of the Ctrl, Enter, and Space keycaps shown in FIG. 6A. Alternatively, as shown in FIG. 13, the joysticks 1302a, 1302b could be positioned at the convergence of the Alt, Ctrl, Page Up, and Enter keycaps. According to one embodiment, the locations for finger-operated joysticks are at the convergence of the N, M, and ↑ (Up-arrow) keycaps. In one embodiment, as depicted in FIG. 13, a keyboard is equipped with both left and right joysticks. The joystick which is not used for the pointing function can be used for the clicker function. The user can select which is the pointer and which is the clicker. For the three-button version, the joystick selected as the clicker can be pressed downward, left, or right to select among clicker options. In another embodiment where both right and left-handed pointing is desired, the clicker function may be assigned to one or more foot switches.

According to one embodiment, locations for on-board trackballs are between the thumb-operated keys and the adjacent finger-operated keys. For example, a trackball can be located between the right Ctrl and the "N" key or adjacent to the "H" key, as shown in FIG. 6A. Such a trackball would be small, such as having a diameter of about 15 to 25 mm, preferably about 20 mm. Pointing devices typically require from one to three clicker buttons. Clicker buttons could be located on the mirror image location (e.g., adjacent to the "G" key), or assigned to one or more foot switches.

Figure 11:
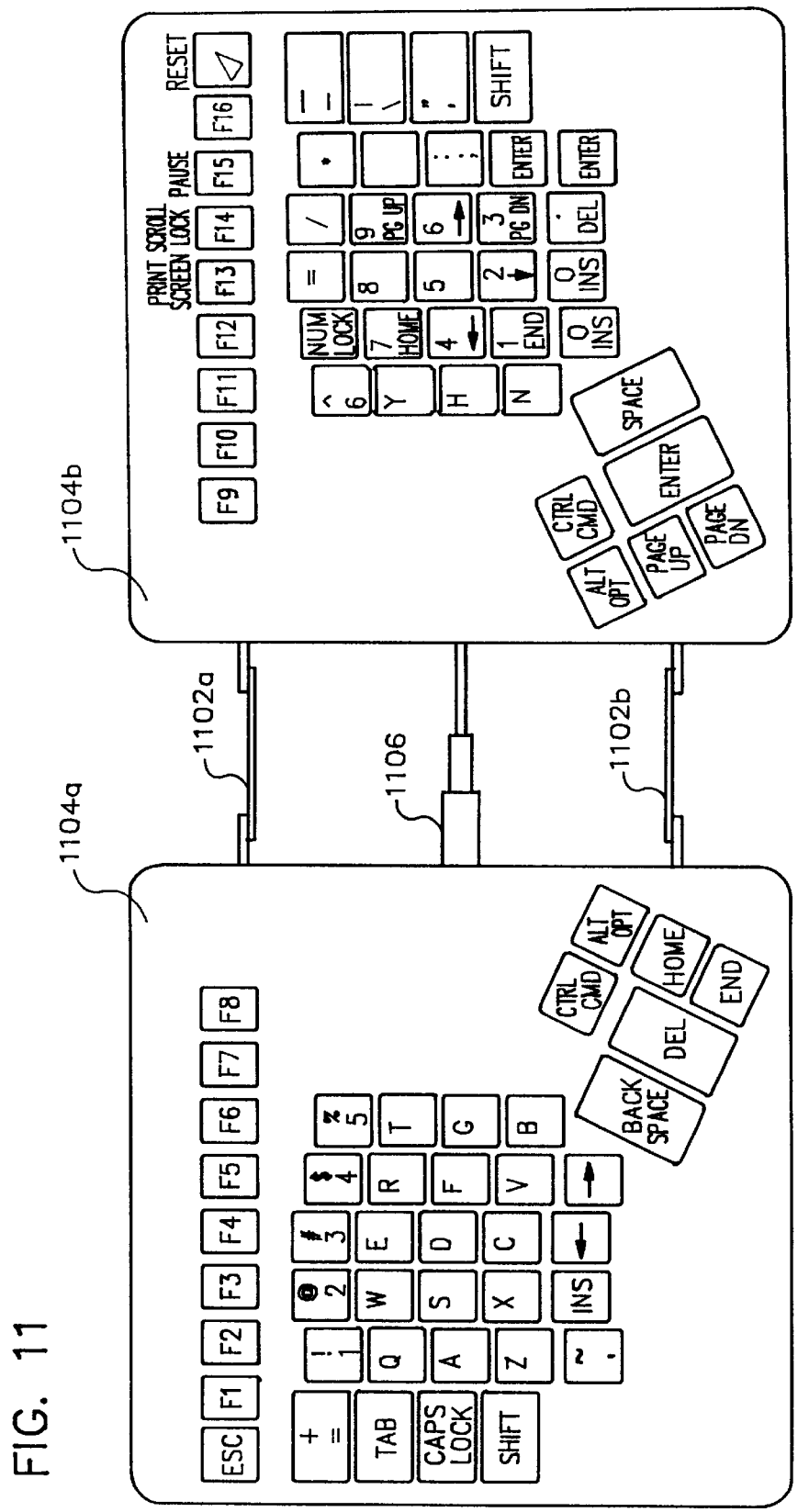
FIG. 11 is a top plan view of a keyboard according to one embodiment of the present invention.

One aspect of the present invention is providing a split keyboard, i.e., spaced-apart left hand and right hand regimes, to more naturally accommodate the position of the human hands and forearms. This spaced-apart configuration requires a minimum lateral extent of the keyboard. Such lateral extent is difficult to accommodate in the space normally provided for small-form computer such as notebook computers, laptop computers, and the like. According to one embodiment of the invention, the keyboard is provided in two halves which are slidingly conducted to permit extension within a certain range. Such extension is accommodated by a sliding linkage 1105 (FIG. 11) similar to the sliding linkage found in expanding tables. For example, as depicted in FIG. 11, lateral expansion sliders 1102a, 1102b connect left and right sides 1104a, 1104b of the keyboard to permit lateral collapse of keyboard from the operative configuration as shown on FIG. 11, to a collapsed configuration with the keyboard sections 1104a, 1104b adjacent one another so as to occupy a space that is compatible with normal notebook or laptop computer keyboard spacing. To permit electrical communication between the two sides of the keyboard 1104, 110b, an expandable or stretchable electrical connection such as a telescoping conduit 1106, or a spiral-twisted cable can be used. The configuration of FIG. 11 can be used also in connection with an full-sized keyboard in order to accommodate individual differences, such as extremely large or extremely small-framed user. Providing a linkage 1102a, 1102b between the halves of the keyboard 1104a, 1104b prevents or discourages the user from using the keyboard in a manner which is inconsistent with ergonomic use, such as positioning the halves in a fashion accessibly angled to one another or which are spaced too far apart for proper ergonomic use. Further, it may be desired to prevent users from employing the keyboard when the keypads are too close together for ergonomic use, such as by disabling the keyboard when the two halves of the keyboard 1104a, 1104b are too close together. This can be achieved by providing sensors on the expansion bars 1102a, 1102b. Alternatively, rather than disabling the keypad, a warning message or signal can be provided.

Figure 12:
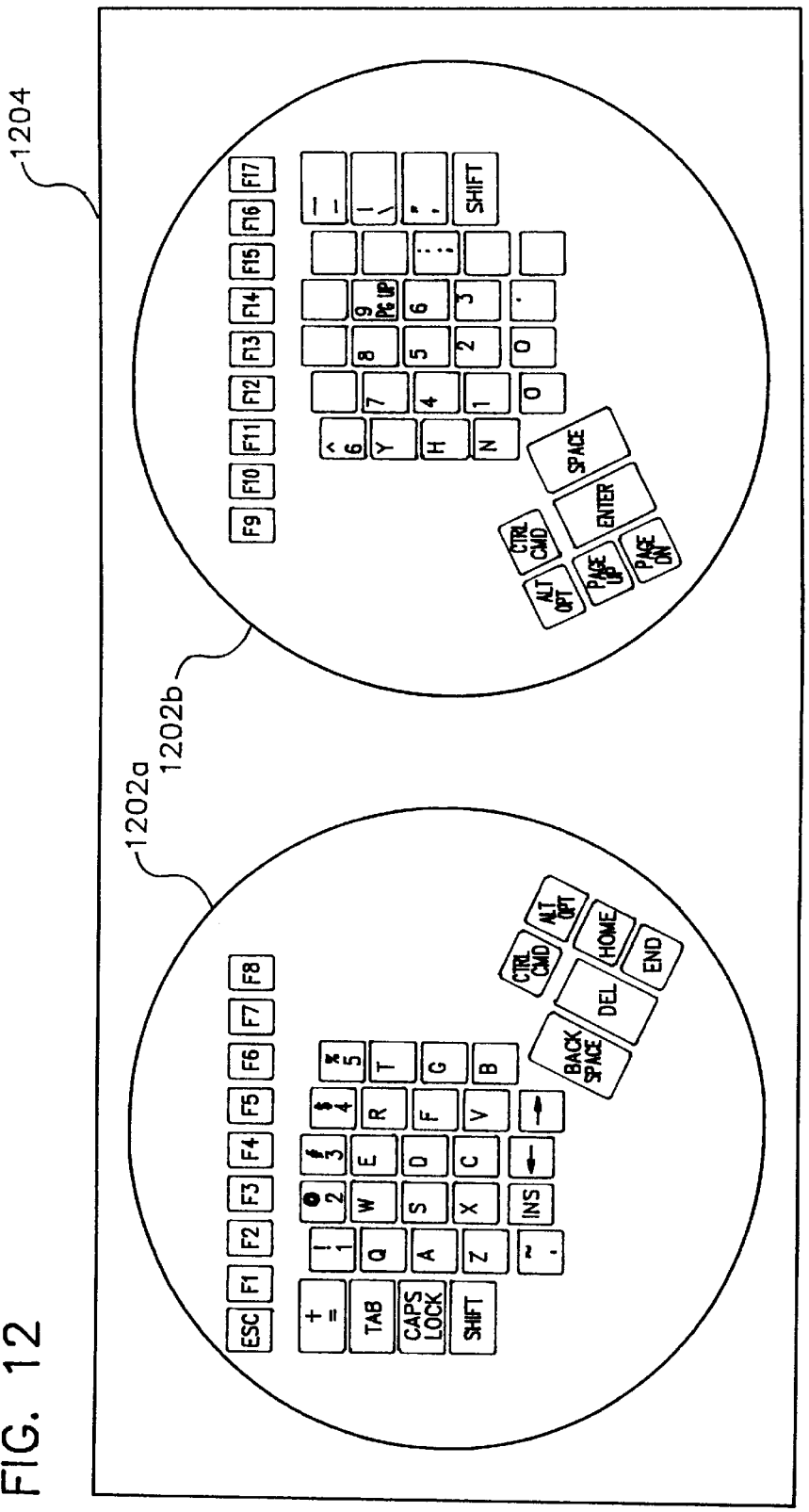
FIG. 12 is a top plan view according to one embodiment of the present invention.

In addition to providing for lateral adjustment, a keyboard can be provided with rotational adjustment by counting the key wells in a rotatable disk structure such as that depicted in FIG. 12. The key areas 1202a, 1202b are positioned on a disk-shaped plate which is rotatably mounted on a circular opening on the cover of the keyboard 1204. Electrical connections from the switches to the keyboard electronics are provided by way of cables having a length sufficient to accommodate rotation within the permissible range. In one embodiment, the keywells can be placed in a structure (which can be the rotatable structure noted above or a non-rotatable structure) which is pivotable to provide angle adjustment, e.g., to permit adjustment in the lateral slope of the keypad, i.e., to adjust pronation or anti-pronation. Preferably, one or more stops or locks are provided on each of the disks 1202a, 1202b to prevent rotation or angling of the keys to a degree which would interfere with the ergonomic operation of the keyboard. Although, in FIG. 12, the alphanumeric keys, function keys, and auxiliary (thumb) keys are rotated or angled as a unit, it is also possible to provide for independent rotation of one or more groups of these keys.

In a further embodiment, the same key layout and orthogonal orientation of keys shown in FIG. 6 could be designed in a flat plane to reduce the learning required compared to that for keys in a concave array. Typists with long fingernails, who are precluded from conveniently using a keyboard with concave alphanumeric arrays, could effectively use such an embodiment. The flat keyboard will nevertheless provide many of the ergonomic benefits described above, such as those arising from the orthogonal layout of the keys and the angled relationship of the thumb keys to the alphanumeric keys and/or the elevation and angling of the function keys. Similarly, a flat keyboard with diagonal rather than orthogonal key layout, nevertheless, can provide beneficial ergonomic results, such as those arising from the sloping of the palm rests and the angling of the thumb keys with respect to the alphanumeric keys.

One embodiment shown in FIG. 5, is a diagonal array of alphanumeric keys essentially identical to the traditional keyboard, except that right and left sides are separated by a space and thumb pads and function keys that are elevated and tilted toward the user are provided as in other embodiments. Learning is essentially eliminated for typing the alphanumeric keys in this embodiment, but significant comfort and performance benefits compared with the traditional keyboards are retained. In all such alternative embodiments, a lateral downward slope of at least approximately 10 degrees is retained for alphanumeric key arrays and palm rests.

One aspect of achieving comfortable fit of both small and large hands is the inclusion of first and second palm rests 136 and 138 for receiving the heel of the operator's left and right hands, respectively. The first and second palm rests 136 and 138 can be fitted with an adhesive or clip-on pad for optimal comfort and for preventing large hands from sliding off.

An especially suitable pad type is a self-adhesive, compliant gel covered with fabric, such as Elasto-Gel from Southwest Technologies, Inc. (Kansas City, Mo.). Another operable pad is a compliant pad, such as a foam rubber pad, preferably covered with a fabric material. Users with small hands are able to rest their palm on the support during most typing activities, while users with medium to large hands are able to comfortably support their palms during virtually all typing activities as well as while resting.

In one embodiment, the palm pads are removable so that the user can install the palm pad of the desired configuration and can orient the palm pad in the desired direction. A number of devices can be used for providing removable attachment of palm pads, including removable adhesives, clips or latches, hook and loop materials (such as Velcro®) and the like. It is also possible to provide the palm pads as an integral part of the keyboard surface. It is further possible to provide the upper portion of the keyboard surface with a configuration suitable for operation as a palm pad but also having portions to accommodate the addition of additional removable or permanent palm pads at the user's discretion.

Figure 14:
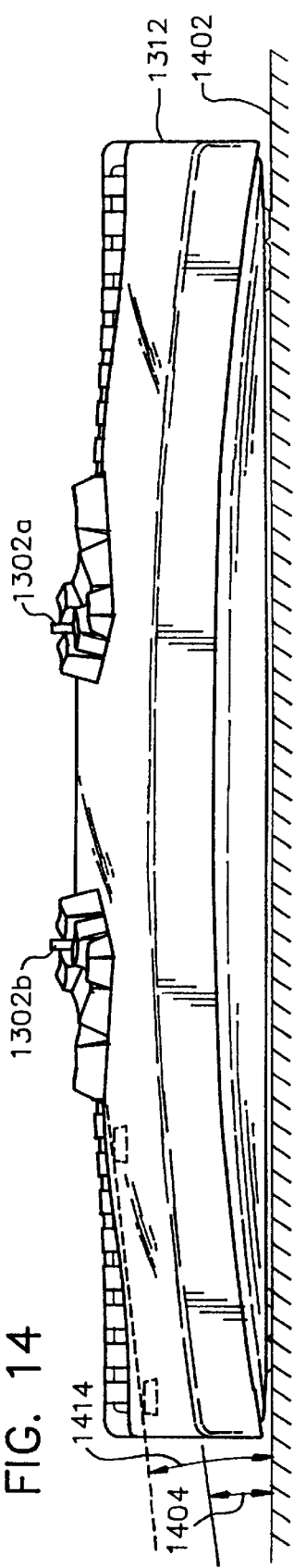
FIG. 14 is a front elevational view of the keyboard in FIG. 13.
Figure 15:
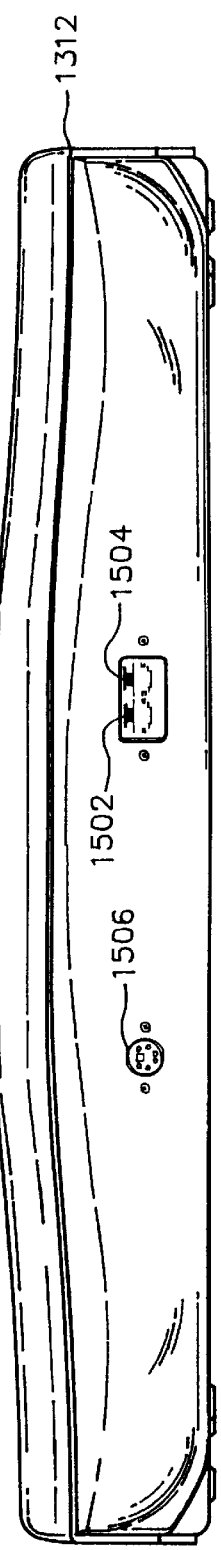
FIG. 15 is a rear elevational view of the keyboard of FIG. 13.
Figure 16:
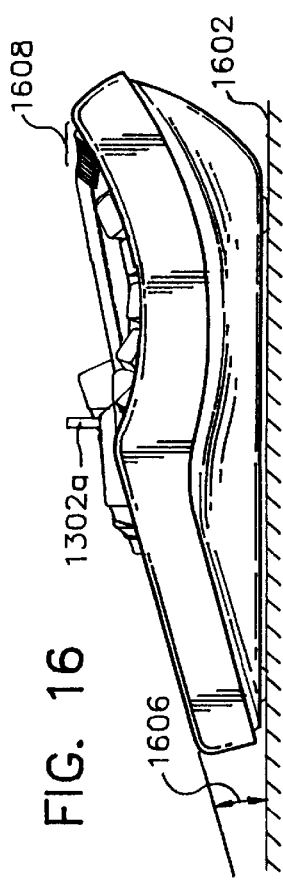
FIG. 16 is a right end view of the keyboard of FIG. 13.
Figure 17:
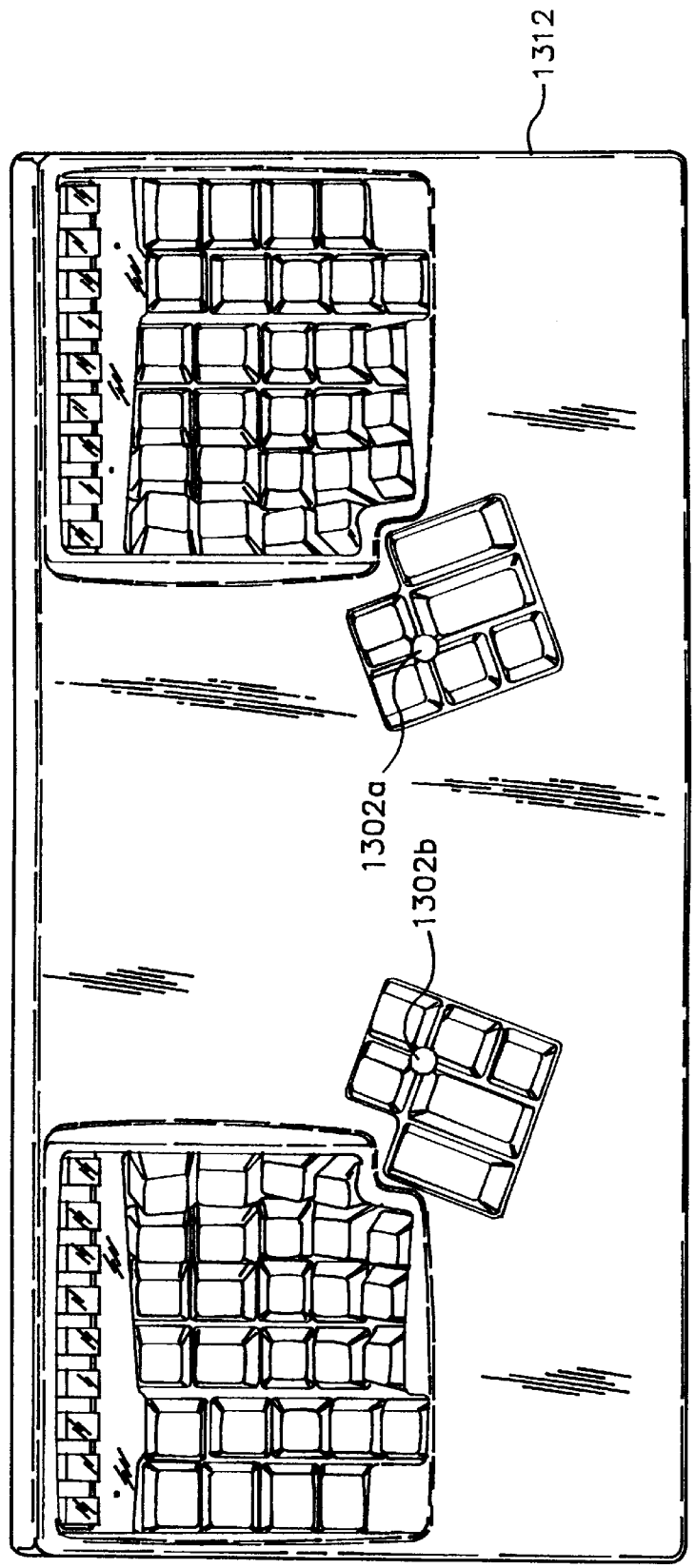
FIG. 17 is a top plan view of the keyboard of FIG. 13.

Again referring to FIG. 1, in the embodiment employing concave alphanumeric key arrays the first and second palm rests 136 and 138 are each elevated above the reference position defined by the keytops of the first and second home rows 112 and 114, respectively. Further, the first and second palm rests 136 and 138 slope downwardly from edges 140 and 142 to second and third edges 144 and 146, respectively. The lateral slope of the first and second palm rests enables the operator's hand to be supported at an angle that varies moderately from full pronation, e.g., about 5 to 50 degrees, preferably about 10 to 40 degrees and more preferably about 10–20 degrees. The frontal slope (towards the operator) should be approximately 10 degrees (and not more than about 15 degrees) to accommodate the natural slope of the relaxed palm from the base of the palm to the base of the fingers. FIGS. 13–17 depict another embodiment of the invention. As seen in FIG. 16, the palm rest area slopes downward toward the user, with respect to the support surface at an angle 1606 of about 10°. As depicted in FIG. 14, the lateral slope 1402 of the palm rest area with respect to the support surface 1402 is about 6° to 8°. As can be seen in FIG. 16, it is not necessary that the medial-lateral axis angle of the palm rest area should exactly match the lateral slope provided by the key wells. As depicted in FIG. 16, the function keys 1608 can be provided in a slightly curving configuration although the general layout of the function keys is substantially linear.

Preferably, the columns of the alphanumeric keywells are rotated slightly with respect to the digital-proximal axis such that the right keywell is rotated slightly counter-clockwise (when viewed from above) and the left keywell is rotated slightly clockwise. The amount of rotation depends on the separation of the keywells. If the separation is larger, the rotation should be somewhat less. In a configuration in which the distance between the keywells (measured from the closest keys) is about 7 to 7½ inches, each of the keywells should be rotated about 1° to 3° in order to comfortably fit a variety of body builds of users. Preferably, the alphanumeric keywells are also tilted slightly downward away from the thumbs. Because of the concave shape of the keywells, it is difficult to define the slope. For reference purposes, the slope can be considered as defined by the slope of the upper (number) key row measured along the highest portions thereof. Using this measure, as depicted in FIG. 14, the slope 1414 from the "5" key to the "+" key is in the range of about 10° to 20°. It is believed that an angle which is greater than about 20° provides little additional benefit to the user and can interfere with the user viewing the tops of the keycaps.

It will be apparent to those skilled in the art that the palm rests are positioned to provide the user with the option to be in contact with the palms of the user while the user is manipulating the keys of the first arrays 108, 116, and 120 and the second arrays 110, 118, and 122. Further, the keys of the first and second arrays 108, and 110 are positioned below the first and second palm rests so that the fingers of the operator may naturally bend downward from the first and second palm rests 136 and 138 while manipulating the keys. The first and second arrays 120 and 122 are positioned above the first and second arrays 108 and 110 and rotated from the reference position so that the thumbs may be in their natural position substantially coplanar with the palm and can move naturally away from the palm to manipulate the keys of the first and second arrays 120 and 122.

The present invention combines features of alternative keyboards (split left and right alphanumeric segments, concave alphanumeric key layout geometry, palm rests), in a novel combination which includes features that provide surprisingly improved performance. This combination of design features minimizes the persistent, previously unsolved problems of conventional keyboards, without changing the familiar QWERTY alphanumeric key layout. Combined with programmabilty features, users have the flexibility to customize the key layout and store repeated keystrokes. Among the aspects which contribute to these improvements are:

1. Reducing the strain and slow typing associated with using the computer function keys, which typically number at least 16, by elevating the function key row and tilting the keys towards the user relative to the plane of the alphanumeric keys. This positions the function keys closer to the home row and more visible to the operator. For split keyboards, (i.e. in which the keys operated by the left hand are laterally spaced apart from the keys operated by the right hand) using split function keys with reduced center-to-center spacing (preferably ⅝ inch) allows the use of at least 8, and typically 9, easily-typed function keys above each alphanumeric segment. Using short-travel switches for the function keys further facilitates convenient typing and allows for a more compact design than full-travel switches. Preferably, these switches are fabricated using conductive rubber or similar switch technology, so that the key cap is soft and compliant. In conjunction with such switches, an audible "click" should be provided (typically using an electronic resonator triggered when the switch makes contact) to maximize feedback to the operator.

2. Reducing the strain as well as inaccuracy and/or visual typing required by the large number of keys (typically at least 15) which have been addressed by the weak right little finger on a traditional computer keyboard. This is achieved by reducing the keys for either right or left hands to eight, by moving to the thumb position the most commonly-used auxiliary keys (Enter/Return, Backspace, Ctrl, Alt, Cmd). In addition, a plurality of new key positions 148–154 have been added to the first and second arrays 108 and 110 as a fifth row. Typically, at least two, and usually three or four new key positions are located in row 5, as best illustrated in FIGS. 4–6. Certain uncommonly-typed keys can be located here to simplify access to the heavily typed keys without changing the layout or requiring relearning for the latter.

3. Reducing the strain and slow typing associated with using the special "control keys", typically pressed in combination with letter keys or with function keys. This is achieved by moving the control keys from proximal-lateral to proximal-medial positions to be pressed typically by the thumbs. This change is especially advantageous when combined with the change in position and attitude of the function keys.

4. Reducing the strain and stretching required in using the standard QWERTY alphanumeric key layout by creating an optimized concave well in which the alphanumeric keys are arrayed. The keys are placed in a generally orthogonal array of rows and columns to minimize awkward and tedious side-reaching with the fingers. However, certain adjacent columns are offset by ¼ to ⅔ (preferably approximately ½) keycap width to better fit the lengths of human fingers. This combination of features, in conjunction with the other features described above, provides the surprising advantage that the typical operator may type the entire alphanumeric key set with hands resting on the palm/wrist support, thus reducing repetitive wrist motions and fatigue. For example, when placing the fingers on the home row of a traditional keyboard and attempting to move the middle finger of the left hand from the "D" key to the "C" key, it is typically impossible to perform this motion without leaving the home row or twisting the wrist. However, with the present keyboard, this motion can be achieved without leaving the home row or twisting the wrist. Providing concave alphanumeric keys allows the typists to keep the hands and fingers in a more relaxed, stress-reducing position, as compared to the arching of fingers typically needed to align with a flat keying surface. Keys within the keywell are elevated slightly toward the thumb sides of the hands to further reduce stress. When this concave, orthogonal array is used with conventional keycaps sloping at different angles in different rows (originally designed to provide curvature to conventional "flat" QWERTY keyboards), the ease and accuracy of typing is further enhanced. Without wishing to be bound by any theory, it is believed the present invention contributes to reduction in strain and injury for a keyboard operator by providing a key layout which is closely in accordance with the natural movements and ranges of the human digits and which places a larger number of keys within such range of natural movement.

5. An embedded 10-key is especially useful to trained typists and 10-key users, because it matches the orthogonal layout which is traditionally employed in separate 10-key numeric pads. An ergonomic remote keyboard as described above is useful for users who need a dedicated 10-key, or additional functions.

6. Optimally positioned and padded palm rests, combined with appropriate positioning of the alphanumeric keys as described herein, allows most operators to type most or all alphanumeric keys while resting the palms.

In this way, most users will have the ability to type all of the alphanumeric characters without significant movement of the hands and particularly while resting on the palm pads. Preferably, the function keys on one side of the keyboard can be activated by a finger of the corresponding hand while the remaining fingers can rest on the home keys. This has not been accomplished previously for keyboards using the traditional QWERTY layout. The use of a compliant gel or other form of pad is also useful in providing comfortable support in a thin layer, so that the relationship of the hand to the keyboard is not significantly changed whether or not the pad is used.

7. The use of a right and left fifth row allows optimal positioning of cursor movement keys. When more than two keys are provided on each side, seldom-used keys normally typed by the little finger in other rows can be repositioned to the fifth row to increase accuracy and speed of typing both the relocated and neighboring keys.

In light of the above description, a number of advantages of the present invention can be seen. Undesirable postures and motions of the hands, wrists, and arms are minimized or eliminated for most operators, including pronation of the wrists, extension of the wrists, and ulnar deviation. Surprisingly, this significant improvement in comfort, accuracy, and endurance is achieved in the best mode of the present invention without requiring the operator to relearn the relative positions of alphanumeric keys. Only minimal learning is required for efficient use of the medially-transferred auxiliary and control keys, and to compensate for the small positional differences of the alphanumeric keys caused by the change from diagonal to orthogonal key layout. While the primary objective of the present invention is improved comfort and endurance, plus reduced strain and stretching, without requiring substantial relearning, a further benefit is increased performance through increased accuracy and decreased visual typing of previously hard-to-reach keys (e.g., the number row). A tactile difference in the keycaps assists the user in positioning fingers in a preferred or predetermined position with respect to the keys. As described above the alphanumeric home keys can be provided with a curvature that differs from other keys. The auxiliary or thumb keycaps can be provided with a different slope or angle. The difference in height of auxiliary keys assists not only in avoiding unwanted activation of keys, but also in providing tactile feedback to the user for positioning the fingers. A keyboard provided according to the present invention results in a more relaxed typing style resulting in reduced stress, strain and impact. At least some users of the keyboard are able to type with an increased speed, compared to previous styles of keyboards and it has been found that overall accuracy of typing is, in general, preserved. The keyboard of the present invention is conducive to a reduced muscle force during typing, corresponding to a "light touch." In general, it is believed that persons typing on the concave alphanumeric pad according to the present invention tend not to "pound" the keys as hard as with previous keyboards. As a result, reduced-force key switches may be employed, further reducing the effort required in typing. Furthermore, by making use of the disclosed programming or remapping of keys, programming or storing multiple keystrokes for a single key, i.e., "macros" and/or using foot switches, the number of repeated keystrokes needed to enter text or data is reduced. It is believed that reduced keystroke repetition will contribute to reduced repetitive motion injury syndromes.

Table I lists a number of potentially stressful conditions associated with keyboard use and the manner in which the ergonomic design of the present invention reduces the stressful condition.

From the foregoing it will be appreciated that, although specific embodiments of the invention have been described herein for purposes of illustration, various modifications may be made without deviating from the spirit and scope of the invention. Accordingly, the invention is not limited except as by the appended claims.

TABLE I

| POTENTIALLY STRESSFUL CONDITION | ERGONOMIC FEATURES DESIGNED TO REDUCE THE STRESSFUL CONDITION |
| --- | --- |
| Force | Low Force, Tactile Keyswitches - require minimal force to activate, and provide mechanical and audible feedback to indicate when a key has been activated. Travel, activation point and force profile are designed to minimize the potential impact from bottoming out. Comprehensive Product Design - people appear to strike keys more lightly because of the neutral hand and arm positions required by the keyboard. |
| Ulnar Deviation | Keywells - separated alphanumeric keywells allow the user to type with hands and arms approximately at shoulder width, reducing the tendency to bend wrists toward little fingers. Key Layout, Embedded 10-Key Keypad - minor changes to the layout and an embedded 10-key keypad reduce the need to bend the right wrist laterally to reach peripheral keys. |
| Pronation | Keywells - elevate the thumb sides of hands. This design reduces the stressful flat-palm posture associated with the traditional keyboard, yet allows user to see the keys and use the home row for support. |
| Wrist Extension | Keywells, Palm Rests - concave keywells and integral palm rests, prevent the user from typing in an extended posture. |
| Abduction | Keypads - separated, so hands and arms are positioned at approximately shoulder width. |
| Hand/Finger Extension | Keywells - concavity permits user to maintain a relaxed hand and finger posture over keyboard, rather than the extended posture required to strike keys arranged on a flat surface. |
| Stressful Allocation of Workload | Thumb Keypads, Foot switches - thumb keypads and optional foot switches more evenly allocate the workload. Reprogramming Options - key remapping and macro capabilities permit users to customize the key layout to suit individual preferences, physiological requirements and specific tasks. |
| Stressful Motions | Vertical Key Layout - alphanumeric keypads arrange keys in vertical (orthogonal) columns, not diagonals, to reflect natural finger movements. Embedded 10-Key - a 10-key embedded in the alphanumeric keypad eliminates the need to bend wrist and arm laterally to strike these keys. |
| Stressful Motions | Closer Function Keys - separated arrays of function keys placed immediately above alphanumeric keypads reduce stressful reaches. Thumb Keypads - reallocate the workload and reduce the need for stressful, sideways motions. |
| Postural Effort | Palm Rests - provide places to rest while thinking or composing, alleviating the significant muscle stress and work associated with keeping hands and arms poised above the keys on a traditional keyboard. |

Appendix A

The following array of numbers defines a set of lines, each of which ends at the position at which a mechanical key-switch (e.g. type MX1A, from Cherry Electronics Corporation, Waukeegan, Ill. U.S.A.) would contact a face plate. These lines therefore represent positions and attitudes of the alphanumeric and thumb keys for the right and left sides of the present invention, generally as depicted in FIG. 6. The first three numbers define one end of the line, and the second three numbers define the other end of the line. The point which is defined is located at the midpoint between the right and left alphanumeric key arrays.

```
LINE -3.68625, 6.67462, 2.04201, -5.626412, 4.89049, 4.921143, 8, 1, 1
LINE -53626412, 4.89049, 4.921143, -3.68082, 4.40724, 1.57183, 8, 1, 1
LINE -5.47696, 5.040864, 4.524379, -4.380041, 6.806573, 1.721562, 8, 1, 1
LINE -4.510779, 3.754514, 1.427841, -5.47696, 5.040664, 4.524379, 8, 1, 1
LINE -5.101057, 6.901806, 1.483988, -5.614666, 5.194831, 3.51583, 8, 1, 1
LINE -5.249757, 3.838916, 1.206808, -5.614666, 5.194831, 3.51583, 8, 1, 1
LINE -5.88672, 6.908103, 1.419731, -6.306084, 5.091255, 4.240977, 8, 1, 1
LINE -6.03027, 3.851587, 1.106739, -6.306084, 5.091255, 4.240877, 8, 1, 1
LINE -7.54553, 6.77835, 1.45902, -7.73648, 5.132073, 3.684937, 8, 1, 1.
LINE -7.65434, 4.53253, 0.97658, 7.73648, 5.132073, 3.684937, 8, 1, 1
LINE -3.79807, 3.05363, 1.92209, -3.78722, 3.0987, 1.72754, 8, 1, 1
LINE -3.12118, 2.76265, 1.90754, -3.11843, 2.80132, 1.71134, 8, 1, 1
LINE -2.53461, 2.19295, 1.77475, -2.53442, 2.23209, 1.57862, 8, 1, 1
LINE -2.24537, 2.85345, 1.88888, -2.26119, 2.88858, 1.69263, 8, 1, 1
LINE -1.97332, -3.51047, 2.01068, -1.98035, 3.55394, 1.81556, 8, 1, 1
LINE -2.6601, 3.76987, 2.09085, -2.66658, 3.80838, 1.89469, 8, 1, 1
POINT 0, 3.25, 2.05, 8, 1
LINE -3.601304, 5.185127, 1.597157, -5.626412, 4.89049, 4.921143, 8, 1, 1
LINE -5.626412, 4.89049, 4.921143, -3.603139, 5.961178, 1.75601, 8, 1, 1
LINE -4.391586, 4.517622, 1.849485, -5.47696, 5.040864, 4.524379, 8, 1, 1
LINE -5.47696, 5.040864, 4.524379, -4.328402, 5.30773, 1.240122, 8, 1, 1
LINE -4.324486, 6.084067, 1.400235, -5.47696, 5.040864, 4.524379, 8. 1, 1
LINE -5.614666, 5.194831, 3.51583, -5.143544, 4.596416, 0.9224, 8, 1, 1
LINE -5.080251, 5.408403, 0.8748596, -5.614666, 5.194831, 3.51583, 8, 1, 1
LINE -5.614666, 5.194831, 3.51583, -5.065645, 6.200934, 1.067919, 8, 1, 1
LINE -6.306084, 5.091255, 4.240877, -5.963534, 4.620381, 0.90972, 8, 1, 1
LINE -5.915799, 5.415294, 0.6974736, -6.306084, 5.091255, 4.240877, 8, 1, 1
LINE -6.306084, 5.091255, 4.240877, -5.889712, 6.192233, 1.07068, 8, 1, 1
LINE -7.73648, 5.132073, 3.684937, -7.606606, 5.316667, 0.9189916, 8, 1, 1
LINE -7.569335, 6.085933, 1.084243, -7.73648, 5.138073, 3.684937, 8, 1, 1
LINE -6.83356, 3.61895, 1.25776, -7.085053, 4.987385, 4.453756, 8, 1, 1
LINE -6.70894, 6.65975, 1.41863, -7.085053, 4.987385, 4.453756, 8, 1, 1
LINE -7.085053, 4.987385, 4.453756, -6.777004, 4.371971, 1.036648, 8, 1, 1
LINE -6.736145, 5.15635, 0.9896589, -7.085053, 4.987385, 4.453756, 8, 1, 1
LINE -7.085053, 4.987385, 4.453756, -6.713065, 5.93212, 1.119186, 8, 1, 1
LINE 7.085053, 4.987385, 4.453756, 6.713065, 5.93212, 1.119186, 8, 1, 1
LINE 6.736145, 5.15635, 0.9896589, 7.085053, 4.987385, 4.453756, 8, 1, 1
LINE 7.085053, 4.987385, 4.453756, 6.777004, 4.371971, 1.036648, 8, 1, 1
LINE 6.70894, 6.65975, 1.41863, 7.085053, 4.987385, 4.453756, 8, 1, 1
LINE 6.83356, 3.61895, 1.25776, 7.085053, 4.987385, 4.453756, 8, 1, 1
LINE 7.569335, 6.085933, 1.084243, 7.73648, 7.132073, 3.684937, 8, 1, 1
LINE 7.73648, 5.132073, 3.684937, 7.606606, 5.316667, 0.918996, 8, 1, 1
LINE 6.306084, 5.091255, 4.240877, 5.889712, 6.192233, 1.07068, 8, 1, 1
LINE 5.915799, 5.415294, 0.8974736, 6.306084, 5.091255, 4.240877, 8, 1, 1
LINE 6.306084, 5.091255, 4.240877, 5.963534, 4.620381, 0.90972, 8, 1, 1
LINE 5.614666, 5.194831, 3.51583, 5.065645, 6.200934, 1.067919, 8, 1, 1
LINE 5.080251, 5.408403, 0.8748596, 5.614666, 5.194831, 3.51593, 8, 1, 1
LINE 5.614666, 5.194831, 3.51583, 5.143544, 4.896416, 0.9224, 8, 1, 1
LINE 4.324486, 6.084067, 1.400235, 5.47696, 5.040864, 4.524379, 8, 1, 1
LINE 5.47696, 5.040864, 4.524379, 4.328402, 5.30773, 1.240122, 8, 1, 1
LINE 4.391585, 4.517622, 1.249485, 5.47696, 5.040864, 4.524379, 8, 1, 1
LINE 5.626412, 4.89049, 4.921143, 3.603139, 5.951178, 1.75601, 8, 1, 1
LINE 3.601304, 5.185127, 1.597157, 5.626412, 4.89049, 4.921143, 8, 1, 1
LINE 2.6601, 3.76987, 2.09085, 2.66656, 3.80838, 1.89469, 8, 1, 1
LINE 1.97332, 3.51047, 2.01068, 1.98035, 3.55394, 1.81556, 8, 1, 1
LINE 2.24537, 2.85345, 1.88888, 2.26119, 2.88858, 1.69263, 8, 1, 1
LINE 2.53461, 2.19295, 1.77475, 2.53442, 2.23209, 1.57862, 8, 1, 1
LINE 3.12118, 2,76265, 1.90754, 3.11843, 2.80132, 1.71134, 8, 1, 1
LINE 3.79807, 3.05363, 1.92209, 3.78722, 3.0987, 1.72754, 8, 1, 1
LINE 7.65434, 4.53253, 0.97658, 7.73648, 5.132073, 3.684937, 8, 1, 1
LINE 7.54553, 6.77835, 1.45902, 7.73648, 5.132073, 3.684937, 8, 1, 1
LINE 6.03027, 3.851587, 1.106739, 6.306084, 5.091255, 4.240877, 8, 1, 1
LINE 5.88672, 6.908103, 4.419731, 6.306084, 5.091255, 4.240877, 8, 1, 1
LINE 5.249757, 3.838946, 1.206208, 5.614666, 5.194831, 3.51583, 8, 1, 1
LINE 5.101057, 6.901806, 1.483988, 5.614666, 5.194831, 3.51583, 8, 1, 1
LINE 4.510779, 3.754514, 1.427841, 5.47696, 5.040864, 4.524379, 8, 1, 1
LINE 5.47696, 5.040864, 4.524379, 4.380041, 6.806573, 1.721562, 8, 1, 1
LINE 5.626412, 4.859049, 4.921143, 3.68082, 4.40724, 1.57183, 8, 1, 1
LINE 3.68625, 6.57462, 2.04201, 5.626412, 4.89049, 4.921143, 8, 1, 1
```

What is claimed is:

1. Keyboard apparatus, for providing input to a computer, comprising:

means for supporting at least a first alphanumeric key array in a doubly-concave configuration to permit activation of all keys in said array by the digits of one hand and for supporting a plurality of auxiliary keys positioned to be activatable by the thumb of said one hand;

at least a first footpedal, coupled to one of said keyboard apparatus and said computer; and rotatable key well means for permitting adjustment of the orientation of keys carried by said rotatable key well means.

2. A method for data input, comprising:

providing a data input device having first and second palm rests, a key array with first and second keys constructed to move between first remote and second proximate positions remote from and proximate to the data input device, respectively, and a rotatable key well means for permitting adjustment of the orientation of keys carried by said rotatable key well means;

supporting the hands of an operator with said first and second palm rests; and moving said first key to said second proximate position while maintaining said second key in said first remote position, said first key being vertically displaced from said second key.

3. Apparatus, as claimed in claim 1, wherein said footpedal is configured such that activation of said footpedal changes the function of at least a first key of said keyboard.

4. Apparatus, as claimed in claim 1, wherein activation of said footpedal performs at least a function selected from the group consisting of:

a shift function;

a caps lock function;

a control key function;

an alt key function;

an escape key function;

an enter key function;

a mouse button function.

5. Apparatus, as claimed in claim 1 wherein activation of said footpedal performs the function of at least one key of said keyboard.

6. Apparatus, as claimed in claim 1, wherein said footpedal has more than two positions.

7. Apparatus, as claimed in claim 1, further comprising a second footpedal coupled to one of said keyboard and said computer.

8. Apparatus, as claimed in claim 1, wherein activation of said footpedal remaps keys on one half of said keyboard to corresponding keys on the other half of said keyboard.

9. Apparatus, as claimed in claim 1 further comprising first and second trackballs coupled to said keyboard.

10. Apparatus, as claimed in claim 1, further comprising means for changing the function of a first sub-plurality of keys of said keyboard from a first function to a second function.

11. Apparatus, as claimed in claim 10 wherein said first function includes alphanumeric functions and said second function includes numeric keypad functions.

12. Apparatus, as claimed in claim 10 wherein said means for changing is a function key of said keyboard.

13. Apparatus, as claimed in claim 10 further comprising indicator means for indicating which of said first and second functions is active.

14. Apparatus, as claimed in claim 10, wherein said means for changing is a dedicated key of said keyboard.

15. Apparatus as claimed in claim 1 further comprising at least a first key configured such that the height of the top of the keycap, when said first key is activated is greater than the height of an upper surface of a keycap of an adjacent key which in unactivated.

16. Apparatus, as claimed in claim 1 wherein said keyboard comprises a first key-carrying portion which is movable with respect to a second key-carrying portion.

17. Apparatus, as claimed in claim 1 further comprising at least a second keyboard, with a plurality of keys, coupled to one of said keyboard apparatus and said computers.

18. Apparatus, as claimed in claim 17 wherein said second keyboard includes at least one key array in a doubly-concave configuration.

* * * * *